(12) United States Patent
Quint et al.

(10) Patent No.: US 12,416,503 B2
(45) Date of Patent: Sep. 16, 2025

(54) DECISION SUPPORT FOR TRIP PLANNING BASED ON ENERGY REQUIREMENTS

(71) Applicant: Rivian IP Holdings, LLC, Plymouth, MI (US)

(72) Inventors: Jason Meyer Quint, Ann Arbor, MI (US); Kok Wei Koh, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 598 days.

(21) Appl. No.: 17/132,085

(22) Filed: Dec. 23, 2020

(65) Prior Publication Data

US 2022/0196419 A1    Jun. 23, 2022

(51) Int. Cl.
*G01C 21/34*    (2006.01)
*G01C 21/36*    (2006.01)
*G06F 16/29*    (2019.01)

(52) U.S. Cl.
CPC ....... *G01C 21/3469* (2013.01); *G01C 21/343* (2013.01); *G01C 21/3484* (2013.01); *G01C 21/3617* (2013.01); *G06F 16/29* (2019.01)

(58) Field of Classification Search
CPC .............. G01C 21/3469; G01C 21/343; G01C 21/3484; G01C 21/3617; G06F 16/29
See application file for complete search history.

(56) References Cited

U.S. PATENT DOCUMENTS

| | | | | |
|---|---|---|---|---|
| 10,156,453 | B2 * | 12/2018 | Park | G01C 21/20 |
| 2009/0140700 | A1 * | 6/2009 | Eberhard | B60L 58/27 |
| | | | | 320/162 |
| 2009/0319176 | A1 * | 12/2009 | Kudoh | G01C 21/3617 |
| | | | | 701/408 |
| 2011/0246061 | A1 * | 10/2011 | Hayashi | G01C 21/3469 |
| | | | | 701/533 |
| 2011/0288765 | A1 * | 11/2011 | Conway | G08G 1/096816 |
| | | | | 701/533 |
| 2012/0253655 | A1 * | 10/2012 | Yamada | B60L 58/12 |
| | | | | 340/870.07 |
| 2014/0046590 | A1 * | 2/2014 | Needham | G06Q 10/109 |
| | | | | 715/810 |
| 2015/0241233 | A1 * | 8/2015 | Loftus | G01C 21/3682 |
| | | | | 701/410 |

(Continued)

*Primary Examiner* — Erin M Piateski
*Assistant Examiner* — Gabriel Joseph Rene Lambert
(74) *Attorney, Agent, or Firm* — Patterson + Sheridan, LLP

(57) ABSTRACT

Various disclosed embodiments include systems, vehicles, and methods for providing decision support to a person planning to make a trip in a vehicle. In an illustrative embodiment, a computing device has computer-readable media storing computer-executable instructions configured to cause the computing device to identify a current travel capability for the vehicle based on available energy aboard the vehicle. A selection of travel information is presented to a user of the computing device. The travel information may include information including a duration of charging required to provide sufficient additional energy to perform a first trip, at least one range of additional travel possible without additional charging after performing the first trip, and at least one potential intermediate destination reachable while performing the first trip without undertaking additional charging.

20 Claims, 18 Drawing Sheets

(56) References Cited

U.S. PATENT DOCUMENTS

| | | | | |
|---|---|---|---|---|
| 2015/0345962 | A1* | 12/2015 | Graham | G06Q 10/047 701/423 |
| 2017/0010125 | A1* | 1/2017 | Adachi | G01C 21/3469 |
| 2017/0074677 | A1* | 3/2017 | Macneille | G01C 21/3469 |
| 2017/0370738 | A1* | 12/2017 | Park | G01C 21/3667 |
| 2018/0143029 | A1* | 5/2018 | Nikulin | G01C 21/3415 |
| 2018/0173219 | A1* | 6/2018 | Lee | B60W 30/182 |
| 2020/0065679 | A1* | 2/2020 | Javeri | G01C 21/343 |
| 2020/0072626 | A1* | 3/2020 | Kumar | G01C 21/3676 |
| 2021/0049832 | A1* | 2/2021 | Maeda | B60W 50/14 |
| 2021/0215491 | A1* | 7/2021 | Liu | G06Q 50/40 |
| 2021/0316633 | A1* | 10/2021 | Kalligeros | B62H 5/001 |
| 2022/0089030 | A1* | 3/2022 | Norberg | H02J 7/0063 |
| 2022/0363238 | A1* | 11/2022 | Li | B60W 10/06 |

* cited by examiner

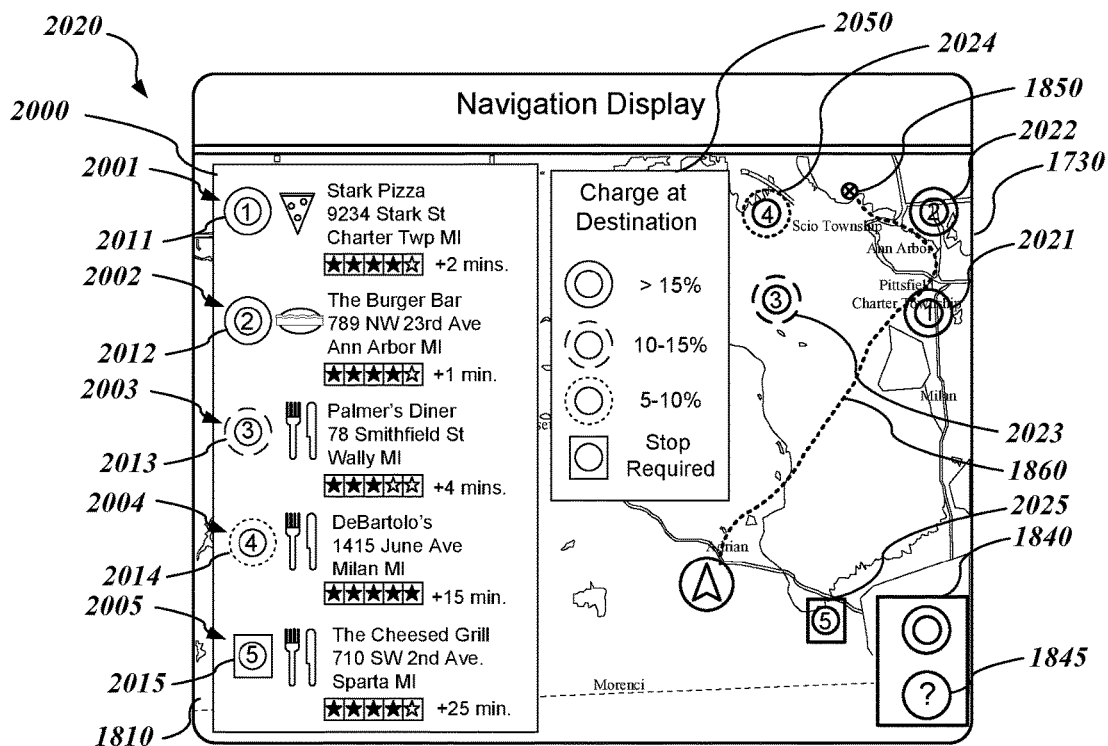
FIG. 20
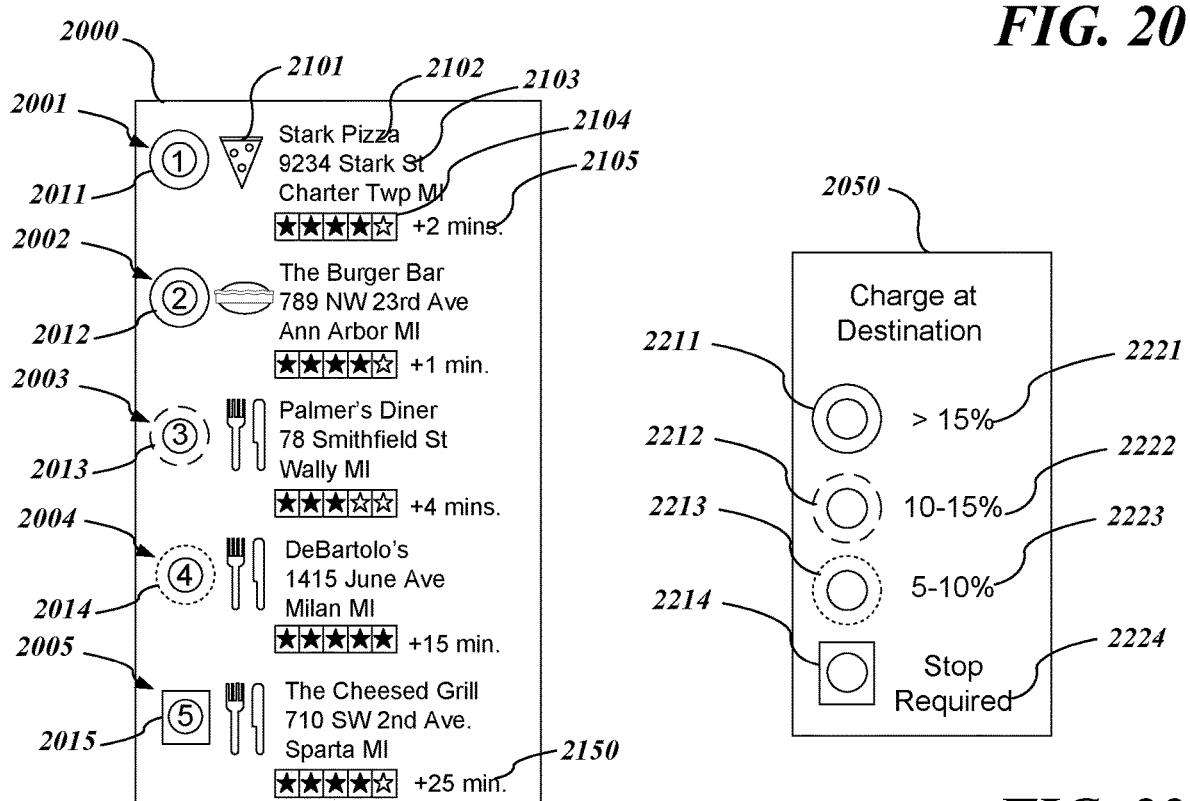
FIG. 21
FIG. 22

DECISION SUPPORT FOR TRIP PLANNING BASED ON ENERGY REQUIREMENTS

INTRODUCTION

The present disclosure relates to systems, vehicles, and methods for providing decision support to a person planning to make a trip in a vehicle.

The statements in this section merely provide background information related to the present disclosure and may not constitute prior art.

Navigation systems such as Global Positioning Systems (GPS) and/or other geolocation devices have become relatively commonplace. A user can provide a navigation system with a desired location, and the system will provide directions from a current location or another specified starting location to a selected destination. Navigation systems also may inform the user of the distance to the destination and an anticipated length of time to complete the trip. The functions of navigation systems may be provided by standalone GPS or geolocation devices, vehicle onboard systems, or applications supported by smartphones, smartwatches, or other computing devices to guide drivers or pedestrians on their way. Many navigation systems also allow a user to specify one or more intermediate destinations between a starting location and a final destination and route the user to the destination by way of the intermediate destination.

These systems may provide the user with a total travel distance and/or total travel time as well as a travel distance and/or time for each part of the journey. However, even with the benefit of such systems, it may be left to an operator or another person traveling in a vehicle to determine whether the vehicle stores enough energy, such as electrical energy, fuel, or other energy, to undertake a trip and/or to stop at one or more intermediate destinations along the way. Even for routine errands, operators or other users may have to stop to consider how much energy or fuel is required to complete the routine trip, how much energy or fuel is currently available aboard the vehicle, how much charging and/or additional fuel is required to complete the errands, and whether the remaining energy will enable the vehicle to reach a next energy source or fueling station.

SUMMARY

Various disclosed embodiments include systems, vehicles, and methods for providing decision support to a person planning to make a trip in a vehicle.

In an illustrative embodiment, a computing device has computer-readable media storing computer-executable instructions configured to cause the computing device to identify a current travel capability for the vehicle based on available energy aboard the vehicle. A selection of travel information is presented to a user of the computing device. The travel information may include information including a duration of charging required to provide sufficient additional energy to perform a first trip, at least one range of additional travel possible without additional charging after performing the first trip, and at least one potential intermediate destination reachable while performing the first trip without undertaking additional charging.

In another illustrative embodiment, a vehicle includes a cabin configured to receive at least one occupant. A drive system is configured to motivate, accelerate, decelerate, stop, and steer the vehicle. The vehicle also includes a computing device having computer-readable media storing computer-executable instructions configured to cause the computing device to identify a current travel capability for the vehicle based on available energy aboard the vehicle. A selection of travel information is presented to a user of the computing device. The travel information may include information including a duration of charging required to provide sufficient additional energy to perform a first trip, at least one range of additional travel possible without additional charging after performing the first trip, and at least one potential intermediate destination reachable while performing the first trip without undertaking additional charging.

In another illustrative embodiment, an illustrative computer-implemented method is provided. A current travel capability for a vehicle is identified based on available energy aboard the vehicle. A selection of travel information is presented including information chosen from a duration of charging required to provide sufficient additional energy to perform a first trip, at least one range of additional travel possible without additional charging after performing the first trip, and at least one potential intermediate destination reachable while performing the first trip without undertaking additional charging.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 6-20 are block diagrams of illustrative screen displays for engaging the system of FIG. 1;

FIGS. 21 and 22 are block diagrams of portions of the illustrative screen display of FIG. 20.

DETAILED DESCRIPTION

The following description explains, by way of illustration only and not of limitation, various embodiments for providing decision support to a person planning to make a trip in a vehicle by providing information about vehicle energy requirements involved in taking the trip. It will be noted that the first digit of three-digit reference numbers and the first two digits of four-digit reference numbers correspond to the figure number in which the element first appears.

By way of a non-limiting introduction and overview, in various embodiments a system determines a current travel capability for a vehicle based on available energy aboard the vehicle. A user of the system is then presented with a range of travel information. In one mode, the travel information includes a charging duration for an electric vehicle to complete a trip and, in various embodiments, the user can enter a desired destination for the trip or choose from a list of most commonly taken trips based on a statistical analysis of the user's past trips. In another mode, the travel information may include identifying an additional range of travel that is possible without additional charging after reaching one or more destinations. In a further mode, the travel information may include presenting intermediate destinations a user can reach on the way to a specified destination without (or with) undertaking additional charging. Accordingly, the user is offered decision support in helping to determine, for example, how long to charge the vehicle at a present location to be able to take a selected trip or what additional travel may be possible on a specified trip without further charging—without the user having to make mental or manual calculations to make those determinations.

Now that a general overview has been given, details of various embodiments will be explained by way of non-limiting examples given by way of illustration only and not of limitation.

Figure 1:
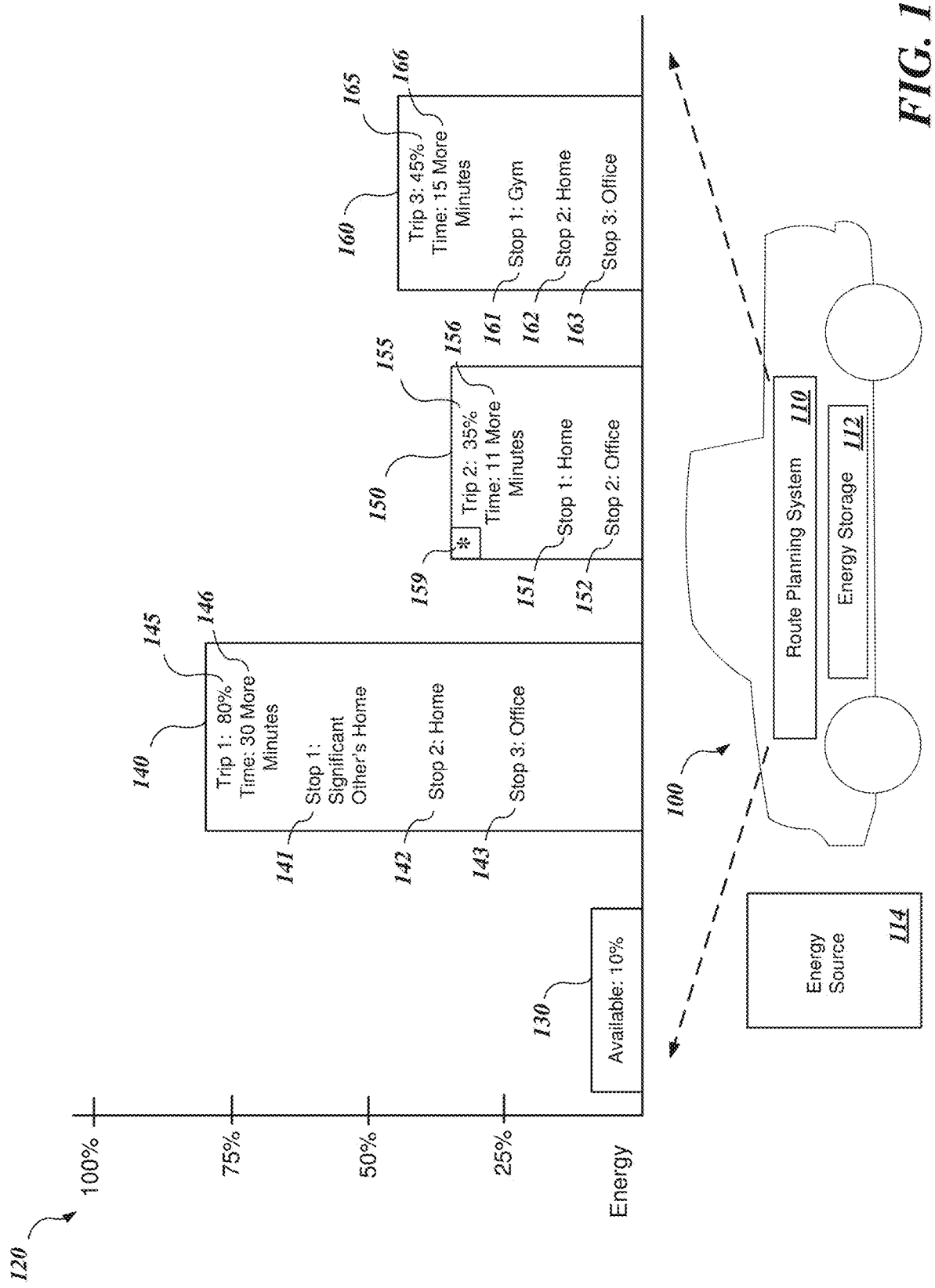
FIG. 1 is a block diagram in partial schematic form of a system for trip planning with energy requirements.

Referring additionally to FIG. 1, in various embodiments a route planning system 110 is integral to or transportable aboard a vehicle 100 to provide travel information 120 to an operator of the vehicle 100 or another user. The vehicle 100 includes energy storage 112 that provides energy for the operation of the vehicle 100. The energy storage 112 is replenishable at an energy source 114. In some embodiments the vehicle 100 may be an electric vehicle. Thus, the energy storage 112 may include one or more batteries and the energy source 114 includes a private or public charging station that provides electricity to charge the batteries. However, the principles described here also are applicable in embodiments in which the vehicle 100 includes an internal combustion engine or is a hybrid vehicle. In such embodiments, the energy storage 112 includes a fuel tank and the energy source 114 includes a gas pump or other fuel source.

In various embodiments, the vehicle 100 may include an electric vehicle and the energy source 114 may include a charging station where the vehicle 100 is docked to replenish its energy storage 112 by charging its batteries. Accessing the travel information 120, the operator or other user is presented with the available charge 130, which is currently 10%. In various embodiments, the route planning system 110 may access information such as the position of the vehicle 100 gathered from GPS/geolocation circuitry (as described further below) and a statistical analysis of historic travel patterns of the vehicle 100. Based on this information, the route planning system 110 may generate travel information 120 that identifies a number of trips that the user is likely to take before arriving at a next charging station or other energy source 114. In the present example, the operator is presented with three different trips 140, 150, and 160 that the route planning system 110 determines are the three most likely trips the vehicle 100 will be directed to take.

A first trip, Trip 1 140, includes three stops 141-143 before the vehicle 100 arrives at a next available energy source 114. For purposes of this example, the next available energy source presumed to be at an office where the vehicle 100 travels each workday. The first stop 141 is at another's home. The second stop 142 is at a home where the vehicle 100 is typically parked overnight. The third stop 143 is at the office where the user works and, as stated, where the vehicle 100 has access to an energy source 114 (FIG. 1) for charging the vehicle 100. The travel information 120 for Trip 1 140 reports that Trip 1 140 will require that the energy storage 112 be replenished to a capacity 145 of 80%. The travel information 120 also indicates that, at the current charging rate, the charging duration 146 will require 30 more minutes.

A second trip, Trip 2 150, includes two stops 151 and 152: the first stop 151 is at the home where the vehicle 100 is typically parked overnight and the second stop 152 is at the office where the vehicle 100 will be able to access an energy source 114 to charge the vehicle 100. The travel information 120 for Trip 2 150 reports that Trip 2 150 will require that the energy storage 112 be replenished to a capacity 155 of 35%. The travel information 120 also indicates that, to reach the capacity 155 of 35%, the charging duration 156 will require 11 more minutes. In various embodiments, the route planning system 110 is configured to enable expedited charging of the energy storage 112 when the intended charging will be of a sufficiently brief duration such that expedited charging will not result in damage to the energy storage 112, as further described below with reference to FIGS. 10-12.

A third trip, Trip 3 160, includes three stops 161-163. The first stop 161 may be at a gym 161, the second stop 162 is at home, and the third stop 163 is at the office where the vehicle 100 will be able to access an energy source 114. The travel information 120 for Trip 3 160 indicates that Trip 3 160 will require that the energy storage 112 be replenished to a capacity 165 of 45%. To reach the capacity 165 of 45%, the travel information 120 reports that the charging duration 166 will require 15 more minutes.

As previously stated, the route planning system 110 may track the travel of the vehicle 100 and thereby identify trips the user is likely to take based on statistical analysis of previous trips. The travel information 120 may include suggested trips based on the current time of day, the day of the week, the position of the vehicle, or other information that may be used to determine where the vehicle 100 may be directed to travel in its next trip. In the foregoing example, the three trips 140, 150, and 160 may be the mostly likely trips based on what trips the vehicle 100 has been directed to travel in the past under similar conditions. In various embodiments, the trips 140, 150, and 160 may be presented in the most likely order based on the statistical analysis of previous trips.

Based on the travel information 120, depending on what the user wishes to do and/or how long the user is willing to spend charging the energy storage 112 of the vehicle 100, the user can select one of the three trips 140, 150, and 160. Alternatively, the user may enter a different destination (or series of destinations) not included in the three trips 140, 150 and 160 predicted in the travel information 120, and the route planning system 110 will revise the travel information 120 to identify charging capacity and charging duration to complete a trip according to the entered information. Whether the user selects one of the three trips 140, 150, and 160 or indicates that the vehicle 100 will take a different trip, the travel information 120 may identify the charging capacity and the charging duration that is required to complete the trip so that the user need not try to mentally or manually determine the charging capacity and the charging duration required.

Figure 2:
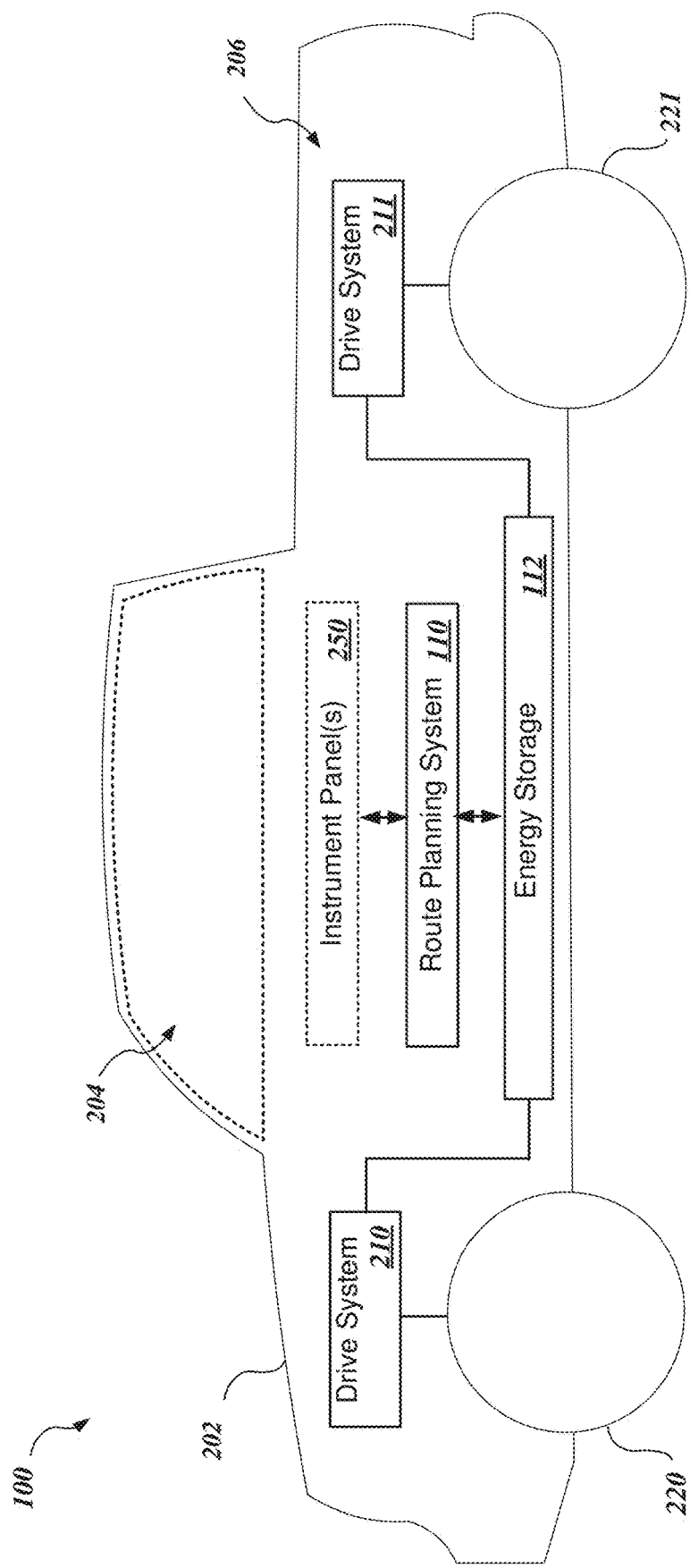
FIG. 2 is a block diagram in partial schematic form of an illustrative vehicle that includes the system of FIG. 1.

Referring additionally to FIG. 2, the route planning system 110 of FIG. 1 may be integrated into the vehicle 100 or may be transportable aboard the vehicle 100. In various embodiments, the vehicle 100 includes a body 202 that may incorporate a cabin 204 capable of accommodating an operator, one or more passengers, and/or cargo. In various embodiments, the vehicle 100 may be controlled by an operator or the vehicle 100 may be a self-driving vehicle.

The vehicle 100 may be an autonomous vehicle that travels without an operator to transport passengers and/or cargo.

The body 202 also may include a cargo area 206 separate from the cabin 204, such as a trunk or a truckbed, capable of transporting cargo. The vehicle 100 also includes one or more drive systems 210 and 211 that are coupled with wheels 220 and 221 to accelerate, decelerate, stop, steer, and otherwise motivate the vehicle 100. Each of the drive systems 210 and 211, as previously described, may include an electrically-powered drive system, an internal combustion-powered drive system, a hybrid drive system, or a drive system powered by another energy source.

In various embodiments, the route planning system 110 may be an integral part of the vehicle 100, including a computing system that is part of the vehicle 100 and integrated with one or more instrument panels 250 disposed in the cabin 204 of the vehicle 100. The instrument panels 250 might include various operational gauges, such as a speedometer, tachometer, and odometer, climate controls, entertainment controls, and other instruments along with presenting the travel information 120 (FIG. 1).

In various embodiments, the route planning system 110 may include a separate computing device transportable aboard the vehicle 100, such as a smartphone, smartwatch, tablet computer, or other portable computing device. In various embodiments, the route planning system 110 may include a computing device that is usable separate from the vehicle 100, such as a portable or non-portable personal computer usable for trip planning, as further described below.

Figure 3:
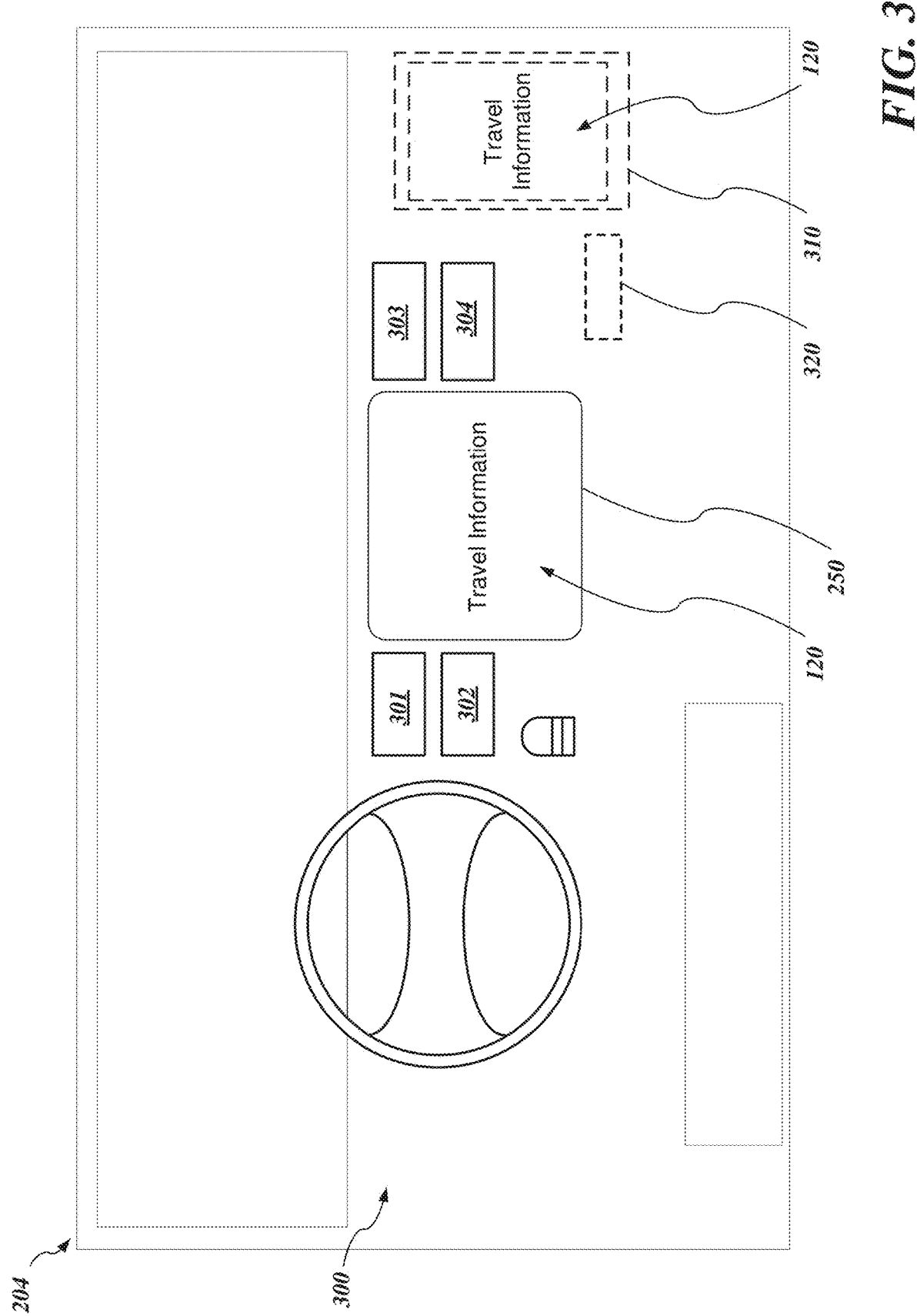
FIG. 3 is a perspective view of a cabin of a vehicle with access to the system of FIG. 1.

Referring additionally to FIG. 3, a dashboard 300 within the cabin 204 shows one of the instrument panels 250 (FIG. 2) that permits access to the route planning system 110. In various embodiments, as previously described, the instrument panel 250 may present the travel information 120. The instrument panel 150 may include a touchscreen display that enables an individual to directly engage the travel information 120, as further described below. In various embodiments where the instrument panel 250 does not include a touchscreen display, controls 301-304 adjacent to the instrument panel 250 may enable user engagement with the travel information 120 to move a cursor, enter characters, or perform other control functions. In various embodiments, the route planning system 110 may be configured to receive and respond to voice inputs.

In various embodiments, instead of or in addition to using the instrument panel 250 (FIG. 2), a portable computing device 310, such as a smartphone, smartwatch, tablet computer, or other portable computing device, may execute an application that operates to present the travel information 120 and/or provide other functions of the route planning system 110. The portable computing device 310 may operate alone or in some combination with a remote computing system, as further explained below. The portable computing device 310 may engage with other systems aboard the vehicle 100, such as the energy storage 112 and/or other devices described further below, via an interface 320. The interface 320 may include a wireless interface, such as a Bluetooth or Wi-Fi interface, or a wired interface using a USB or other wired connection. In various embodiments, the interface 320 may enable the portable computing device 310 to provide input to the energy storage 112 or other systems aboard the vehicle 100 to control their operation.

Figure 4:
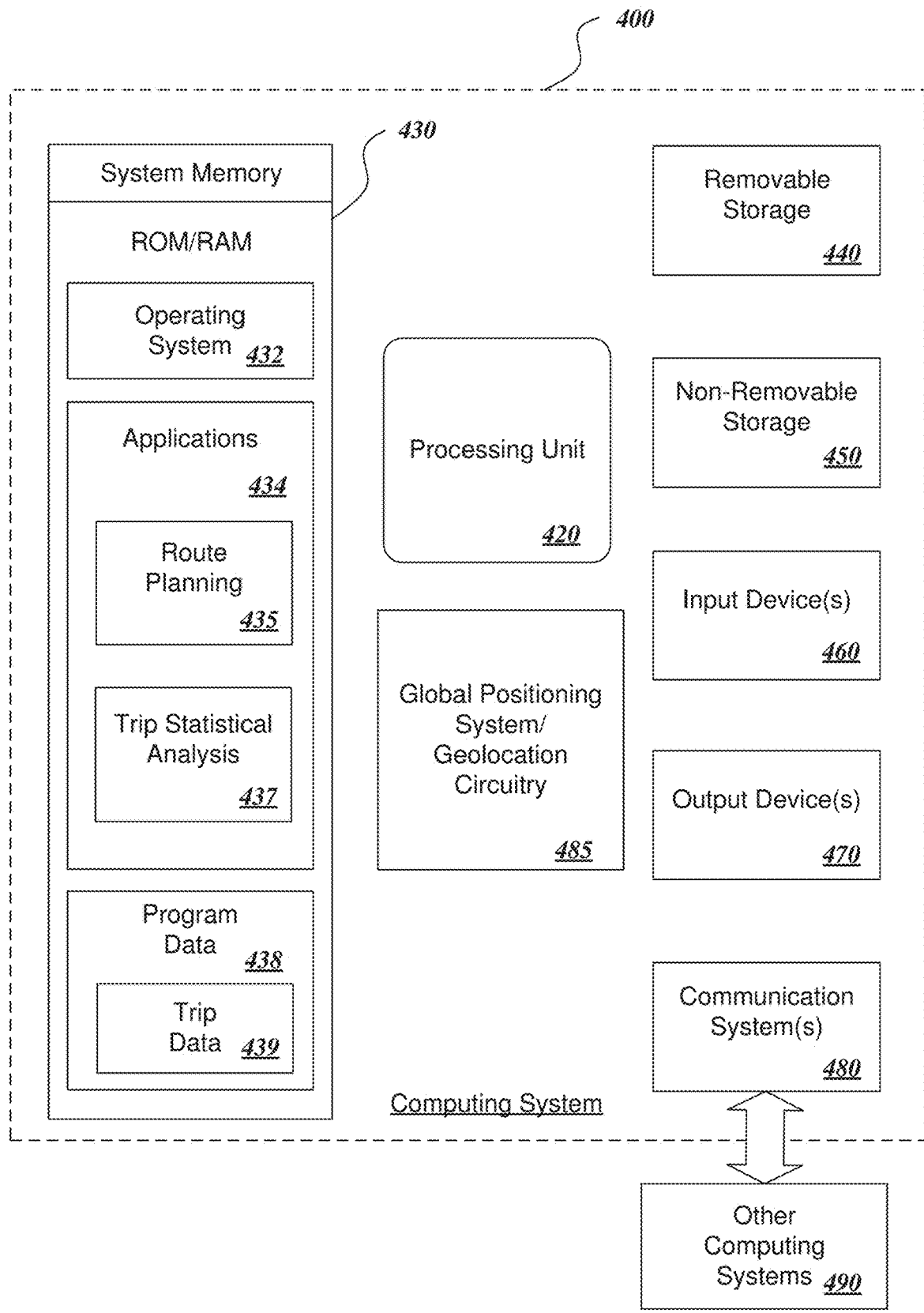
FIG. 4 is a block diagram of an illustrative computing system for performing functions of the system of FIG. 1.

Referring additionally to FIG. 4 and given by way of example only and not of limitation, an illustrative computing device 400 may be used aboard the vehicle 100 (FIG. 2) to perform the functions of the route planning system 110 (FIGS. 1 and 2) whether the route planning system 110 is integral with the vehicle 100 or performed by the portable computing device 310 (FIG. 3). In various embodiments, the computing device 400 typically includes at least one processing unit 420 and a system memory 430. Depending on the exact configuration and type of computing device, the system memory 430 may be volatile memory, such as random-access memory ("RAM"), non-volatile memory, such as read-only memory ("ROM"), flash memory, and the like, or some combination of volatile memory and non-volatile memory. The system memory 430 typically maintains an operating system 432. The operating system 432 may include any number of operating systems executable on desktop or portable devices including, but not limited to, Linux, Microsoft Windows®, Apple OS®, or Android®, or a proprietary operating system. The system memory 430 also may include one or more applications 434. In various embodiments, the applications 434 will include a route planning application 435 and a trip statistical analysis application 437 to support the route planning system 110 (FIG. 1). The system memory 430 also may include program data 438. In various embodiments, the program data 438 includes trip data 439 from past trips taken in the vehicle 100 to provide data for the trip statistical analysis application 437 and the route planning application 435.

The computing device 400 may also have additional features or functionality. For example, the computing device 400 may also include additional data storage devices (removable and/or non-removable) such as, for example, magnetic disks, optical disks, tape, or flash memory. Such additional storage is illustrated in FIG. 4 by removable storage 440 and non-removable storage 450. Computer storage media may include volatile and non-volatile, removable and non-removable media implemented in any method or technology for storage of information, such as computer-readable instructions, data structures, program modules or other data. The system memory 430, the removable storage 440, and the non-removable storage 450 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 400. Any such computer storage media may be part of the computing device 400.

The computing device 400 may also have input device(s) 460 such as a keyboard, stylus, voice input device, touchscreen input device, etc. Output device(s) 470 such as a display, speakers, short-range transceivers such as a Bluetooth transceiver, etc., may also be included. The computing device 400 also may include one or more communication systems 480 that allow the computing device 400 to communicate with other computing systems 490, as further described below. As previously mentioned, the communication system 480 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In various embodiments, the computing device 400 may include global positioning system ("GPS")/geolocation circuitry 485 that can automatically discern its location based on relative positions to multiple GPS satellites or other signal sources, such as cellphone towers. The GPS/geolocation circuitry 485 may be used to determine a location of the vehicle 100. The location of the vehicle 100 may be used to determine trips that an operator or user of the vehicle 100 may desire to take and distance to various potential stops in those trips as described with reference to FIG. 1. Thus, the GPS/geolocation circuitry 485 may be used to generate the travel information 120 of FIG. 1 and other travel information described below.

Figure 5:
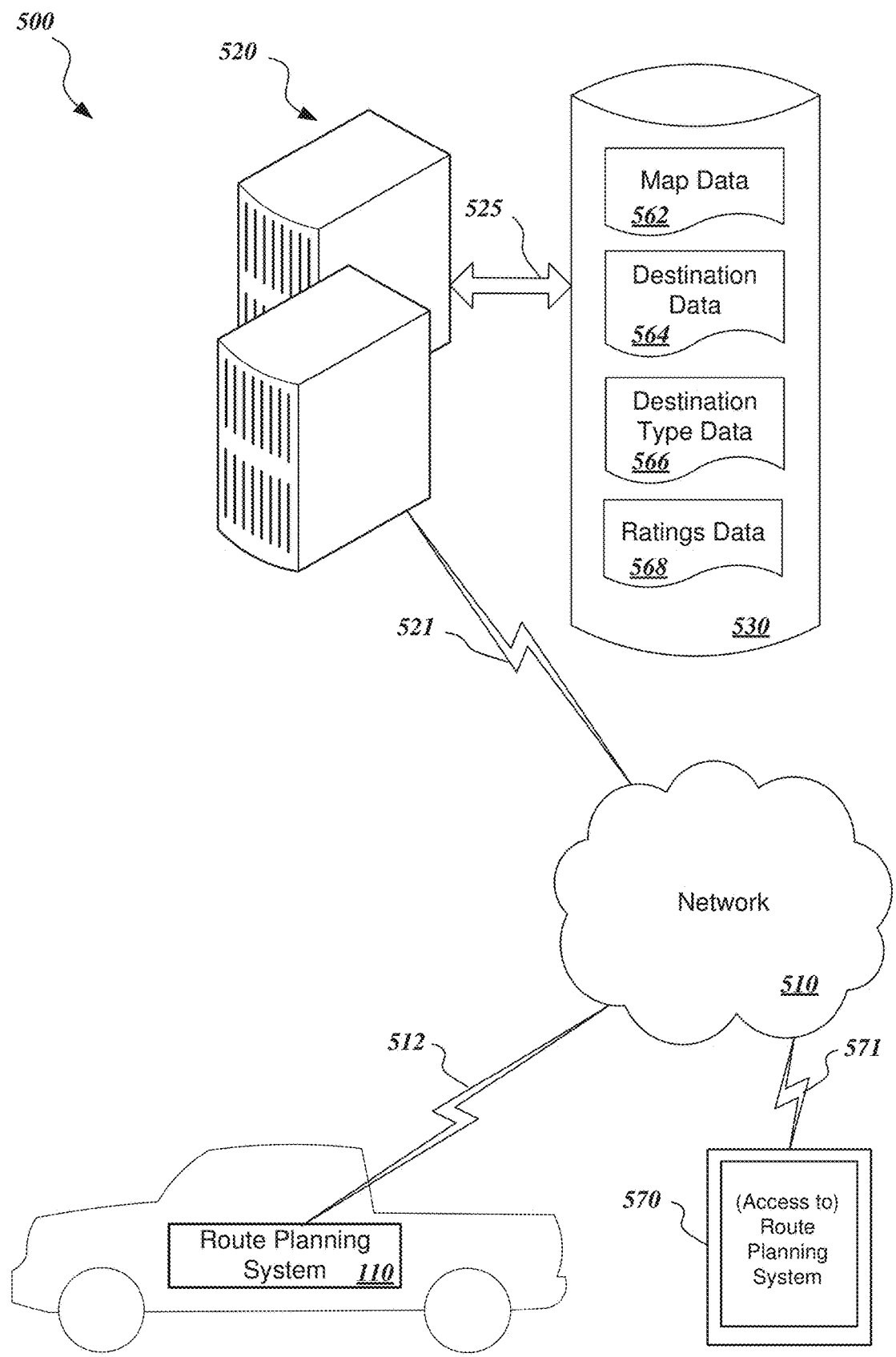
FIG. 5 is a block diagram of one or more remote systems in communication with the system of FIG. 1.

In addition to one or more onboard computing systems, various embodiments may communicate with remote computing systems to perform the functions herein described. Referring additionally to FIG. 5, an operating environment 500 may include one or more sets of remote computing systems 520. The remote computing system 520 may support the route planning system 110 (FIGS. 1 and 2). The remote computing system 520 may provide an additional source of mapping and/or navigational data, as well as a directory of destinations by name, address, and/or coordinates that the user may wish to travel to as a destination or intermediate destination. The remote computing systems 520 also may support the route planning system 110 by, for example, performing the statistical analysis of past trips taken by the vehicle 100 in listing likely trips in the travel information 120 (FIG. 1). Although shown as a single computing system at a single location in FIG. 5, it will be appreciated that the remote computing system 520 may include one or more computing systems residing at one or more locations.

The remote computing system 520 each may include a server or server farm and may communicate with the network 510 over wired and/or wireless communications links 521, respectively. The remote computing system 520 may access programming and data used to perform their functions over high-speed buses 525 to interact with data storage 530. In various embodiments, the remote computing system 520 may service requests for map data 562, destination data 564 that may be stored via location or coordinates, and/or destination type data 566 that may retrieve potential destinations and/or intermediate destinations based on a type specified by the user. The data storage 530 also may include ratings data 568 that maintains a quality assessment of various locations. The ratings data 568 may be created by the user or be drawn from an online ratings service that collects ratings from visitors or patrons of the locations. It will be appreciated that some or all of the data maintained in the data storage 300 may be accessible from or stored in a user's computing system without accessing the data storage 530 over the network 510.

The route planning system 110, as previously described with reference to FIGS. 1 and 3, may be supported by a computing device integrated with the vehicle 100 or supported by a portable computing device 310 transportable aboard the vehicle 200. The route planning system 110 may communicate over the network 510 via a communications link 512 to access the remote computing system 520 to access the map data 562, the destination data 564, and/or the destination type data 566, or other data or applications. The communications link 512 may include a wireless communications link to enable mobile communications with the route planning system 110 aboard the vehicle 100 or may include a wired or inductive link for use when the vehicle 100 is stopped.

The route planning system 110 also may be accessible by a remote computing system 570 that may not be integrated with or transported aboard the vehicle 100. The remote computing system 570 may include a separate computing system, such as a desktop computer, a portable computer, tablet computer, smartphone, or smartwatch in the nature of the computing device 400 of FIG. 4. The remote computing system 570 may be usable to access the route planning system 110 and review and respond to the travel information 120 (FIG. 1). The remote computing system 570 thus may enable the user to engage the route planning system 110 to make route planning or charging decisions away from the vehicle 100. For example, the user may engage and/or operate the route planning system 110 from a desktop computer inside the user's office, from a portable computer in the user's home, from a smartphone while standing outdoors, or from any other location that permits the remote computing system 570 wired or wireless access to the network 510. The remote computing system 570 may communicate with the route planning system 110 by using a communications link 571 to access the network 510. The remote computing system 570 also may permit access the remote computing system 520 to access the map data 562, the destination data 564, and/or the destination type data 566.

Figure 6:
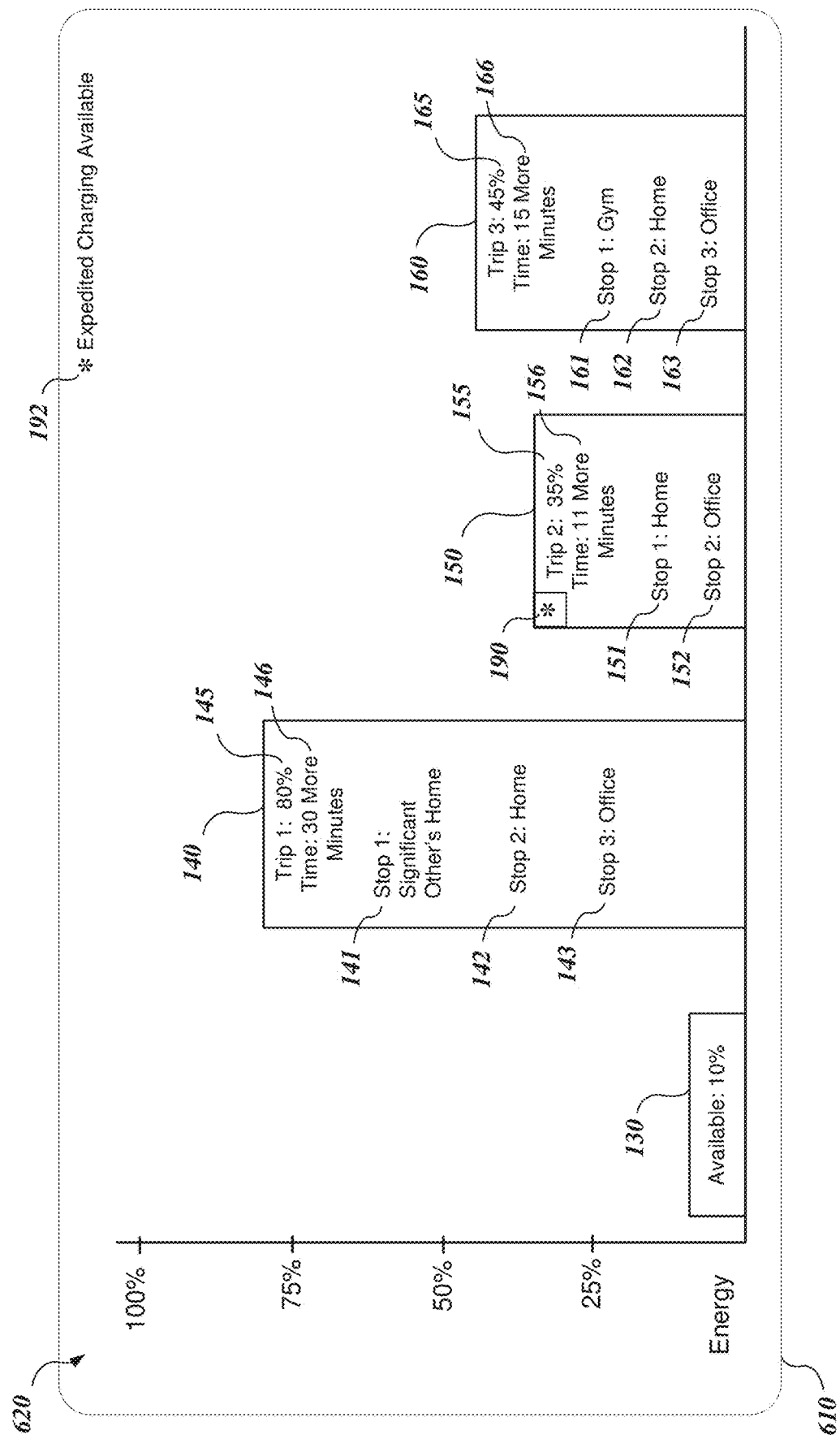

Operation of the route planning system 110 is further described with reference to the following figures. Referring additionally to FIG. 6, travel information 620 similar to that of FIG. 1 is presented on a display 610 associated with the route planning system 110. The display 610 may be integrated in the vehicle 100 (FIGS. 1 and 2) or the display 610 may be associated with the portable computing device 310 (FIG. 3) or the remote computing system 570 (FIG. 5). Based on the travel information 620, the user may select one of the trips 140, 150, and 160 via a touchscreen display, as previously described with reference to FIG. 3. However, it will be appreciated that the selection could be made with a voice input or another input device that are commonly supported by computing devices. The travel information 120 may be updated as the vehicle charges and/or in response to the user's selection or selections, as further described below.

As further described below, it is possible that one or more of the trips 140, 150, and 160 may be of a duration that permits expedited charging. In various embodiments, the energy storage 112 (FIGS. 1 and 2) of the vehicle 100 may be charged at an increased rate when charging at the increased rate will not inflict appreciable damage on the energy storage 112. For example, charging at an expedited rate for more than a relatively brief period may result in excess heat in the energy storage 112 that may damage the energy storage 112 so as to diminish the ability of the energy storage 112 to hold a charge. However, for a relatively brief period—such as may be needed to charge the energy storage 112 for a short trip or series of trips—expedited charging may enable the user to sufficiently charge the energy storage 112 for the short trip in a shorter time.

In various embodiments, when expedited charging is available for a trip, an indicator may be associated with the trip. For example, in the travel information 620 of FIG. 6, it is assumed that Trip 2 150 requires that the energy storage 112 be charged only an additional 25% from an available charge 130 of 10% to reach the charging level 155 required for Trip 2 150. For purposes of this example, it is assumed that charging of an additional 25% is within tolerances for which expedited charging may be used. Accordingly, an expedited charge availability indicator 190 is associated with Trip 2 150 in the travel information 620. A legend 192 explaining the availability indicator also may be included in the trip information 620.

Figure 7:
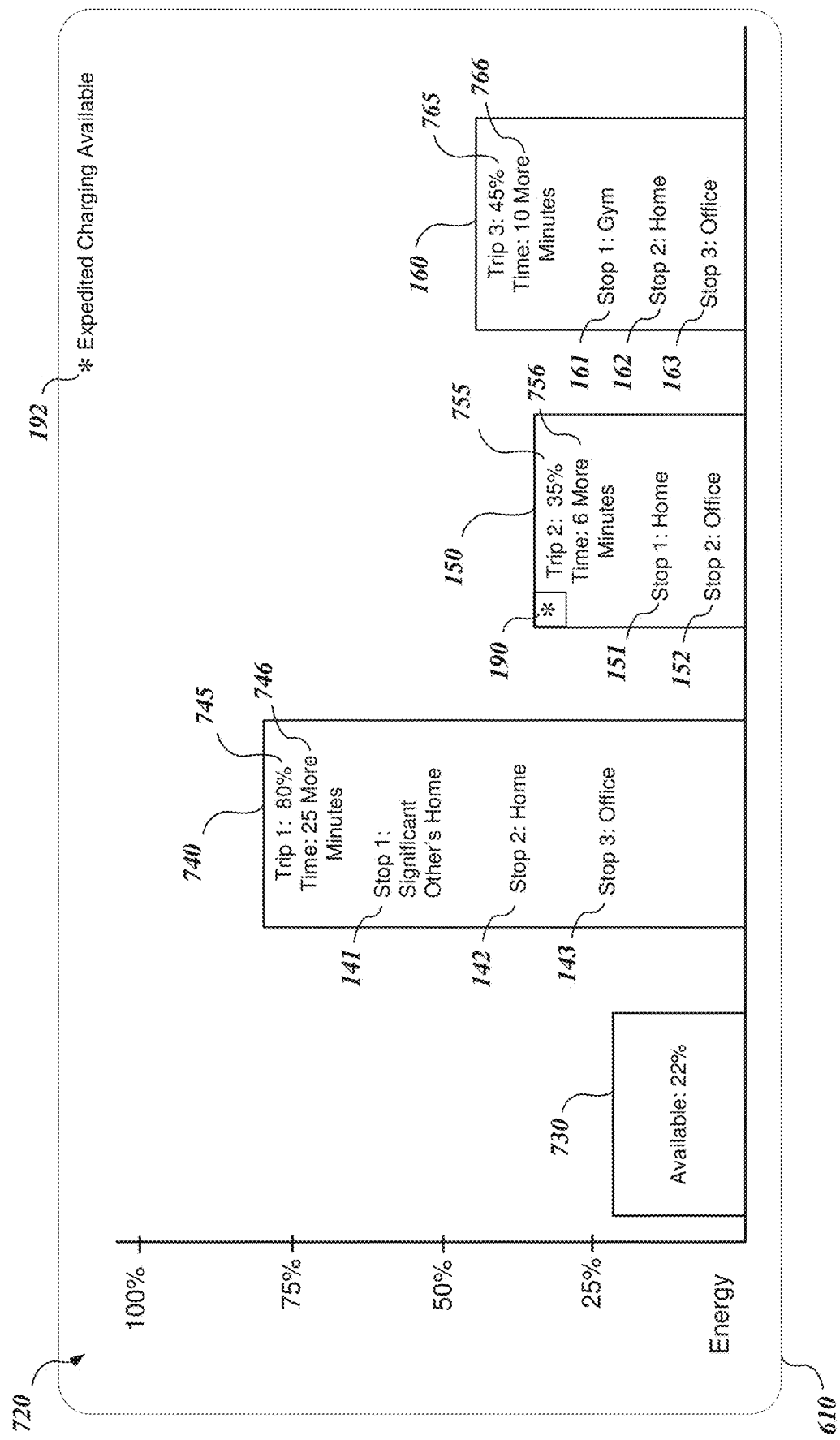

Referring additionally to FIG. 7, updated travel information 720 is presented after the vehicle 100 has continued to charge for a period of approximately five minutes without any user selections or other user engagement with the travel information 620 (FIG. 6) presented via the display 610. For purposes of this example, it is assumed the energy storage 112 (FIGS. 1 and 2) of the vehicle 100 charge at a standard charging rate of 2.33% per minute. Thus, in the state presented by the updated travel information 720 after five minutes of charging, an available charge 730 has now reached approximately 22%. As the energy storage 112 of the vehicle 100 (hereafter, just "the vehicle 100") continues to charge, an available charge 730 is updated. In various embodiments, the charge level 730 may be checked via the display 610 in the vehicle 100 or from a remote computing system 570 (FIG. 5).

Figure 8:
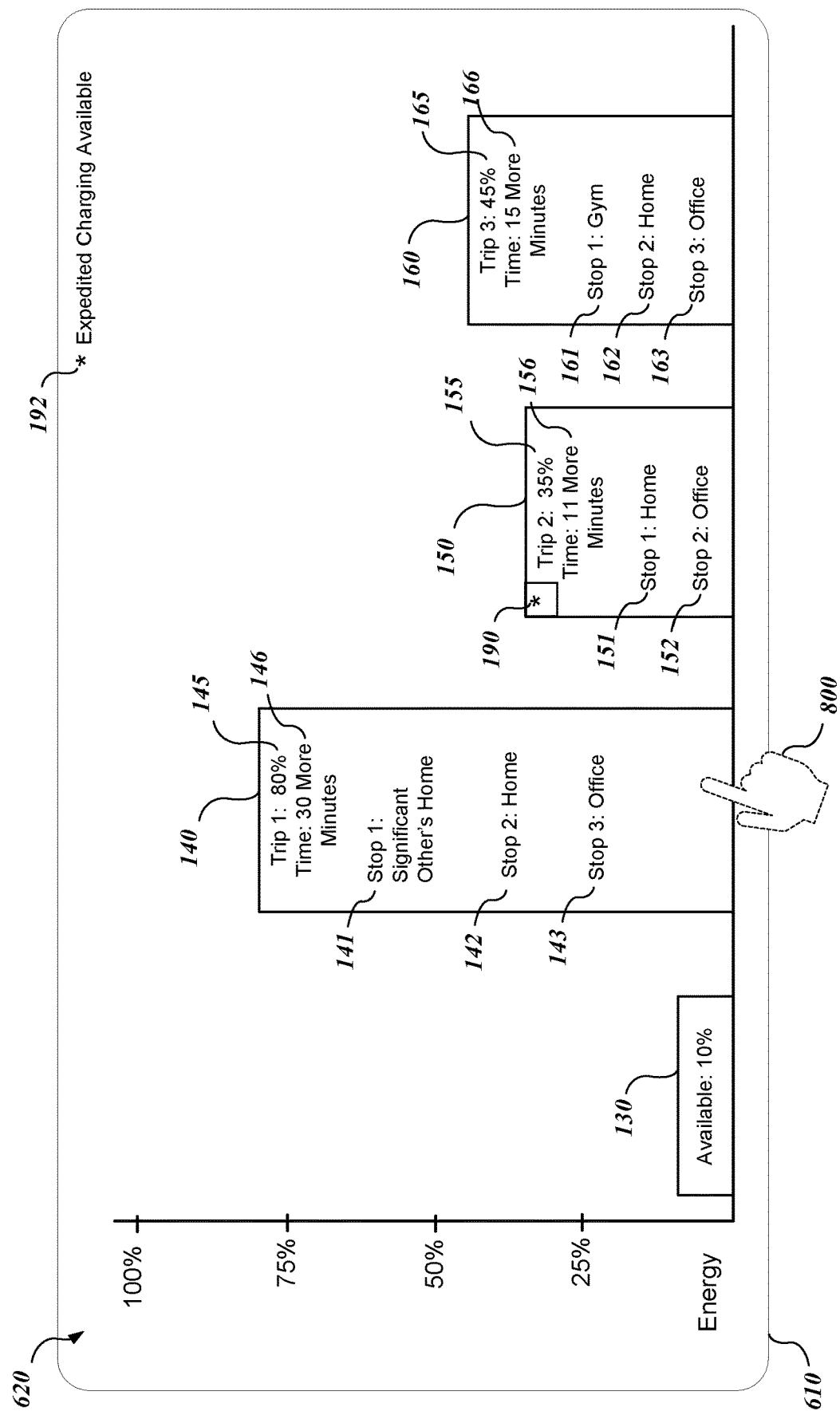

Referring additionally to FIG. 8, the display 610 presents the travel information 620 as presented in FIG. 6 before the additional charging of five minutes represented in FIG. 7. In the example of FIG. 8, the user engages the travel information 620, such as by using a hand 800 when the display 610 includes a touchscreen display as previously described, although voice inputs or other input methods and devices may be used by the user to engage the travel information 620.

Figure 9:
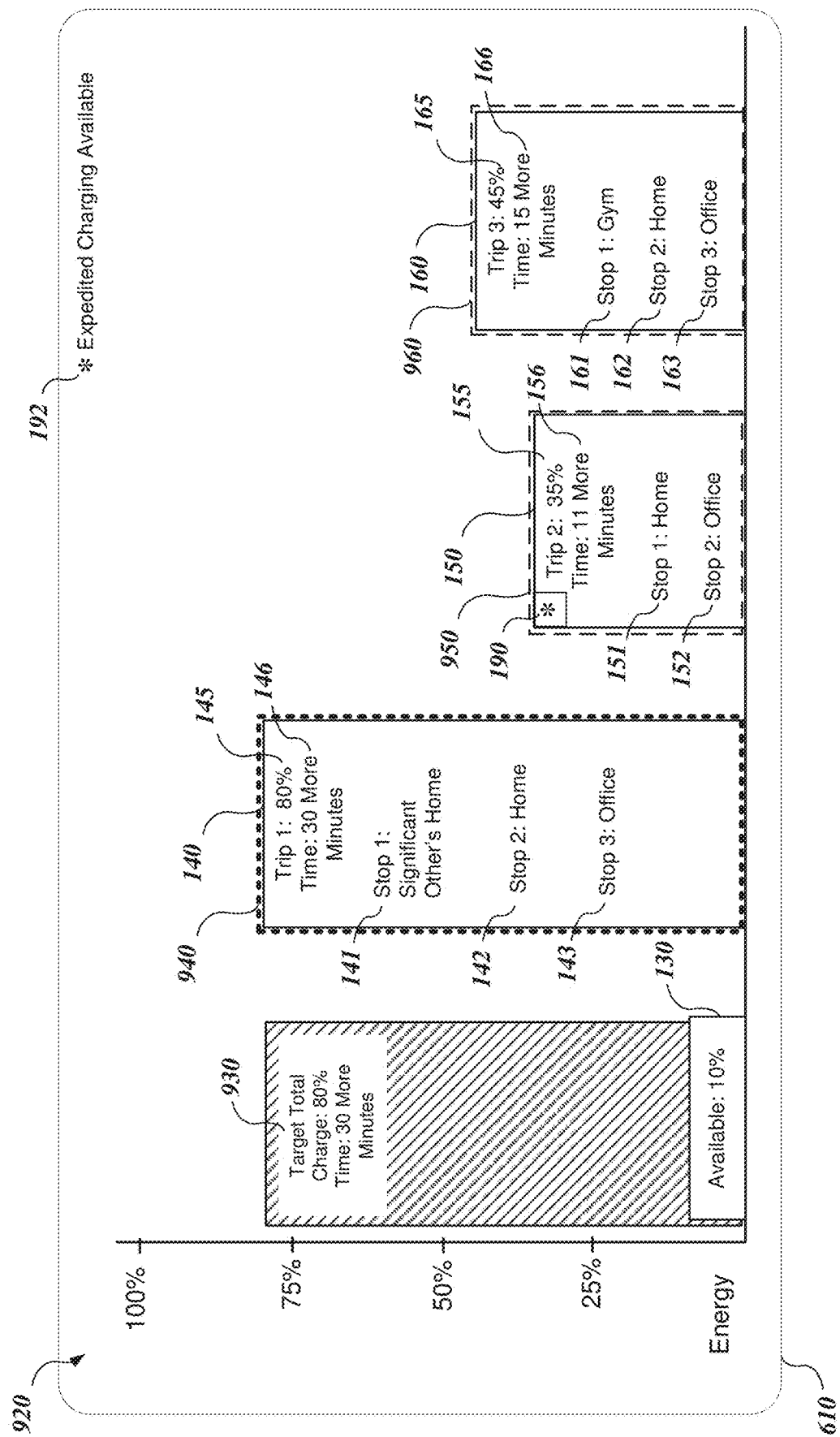

Referring additionally to FIG. 9, in response to the user's selection of Trip 1 140, updated travel information 920 is presented. Next to the available charge 130, a charging indicator 930 is presented indicating a total charge of 80% that will require 30 more minutes of charging. Information presented by the additional charge indicator 930 corresponds with information associated with Trip 1 140 that reported that the trip would require a total charge 145 of 80% and would require an additional charging time 146 of 30 more minutes. In various embodiments, the updated travel information 920 identifies the user's selection, for example, by highlighting Trip 1 140 (shown as a dotted line 940 around Trip 1 140 in FIG. 9) and by eliminating, dimming, graying out, or otherwise deemphasizing the non-selected trips (that is, Trip 2 150 and the Trip 3 160 as indicated by dashed outlines 950 and 960, respectively).

Figure 10:
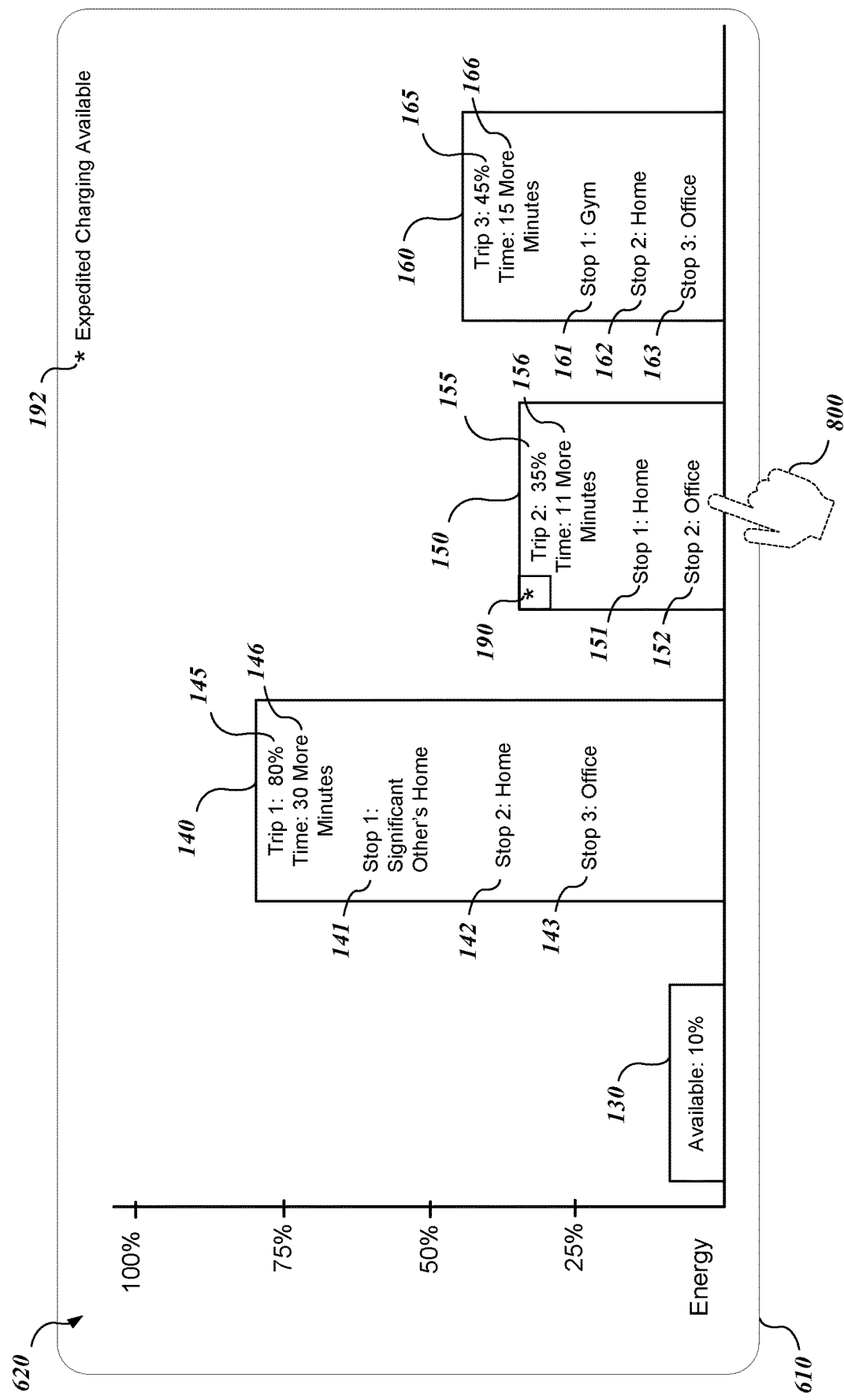

Referring additionally to FIG. 10, the display 610 presents the travel information 620 as presented in FIG. 6 before the additional charging of five minutes represented in FIG. 7 or the user's selection of Trip 1 140 as shown in FIG. 8. In the example of FIG. 10, the user uses the hand 800 to engage the travel information 620 to select Trip 2 150. In various embodiments, because Trip 2 150 requires a relatively low charge capacity 155, the system 110 determines that charging from the available charge 130 of 10% to the charging capacity 155 of 35% for Trip 2 150, expedited charging is available as signified by the expedited charge availability indicator 190 being associated with Trip 2 150.

Figure 11:
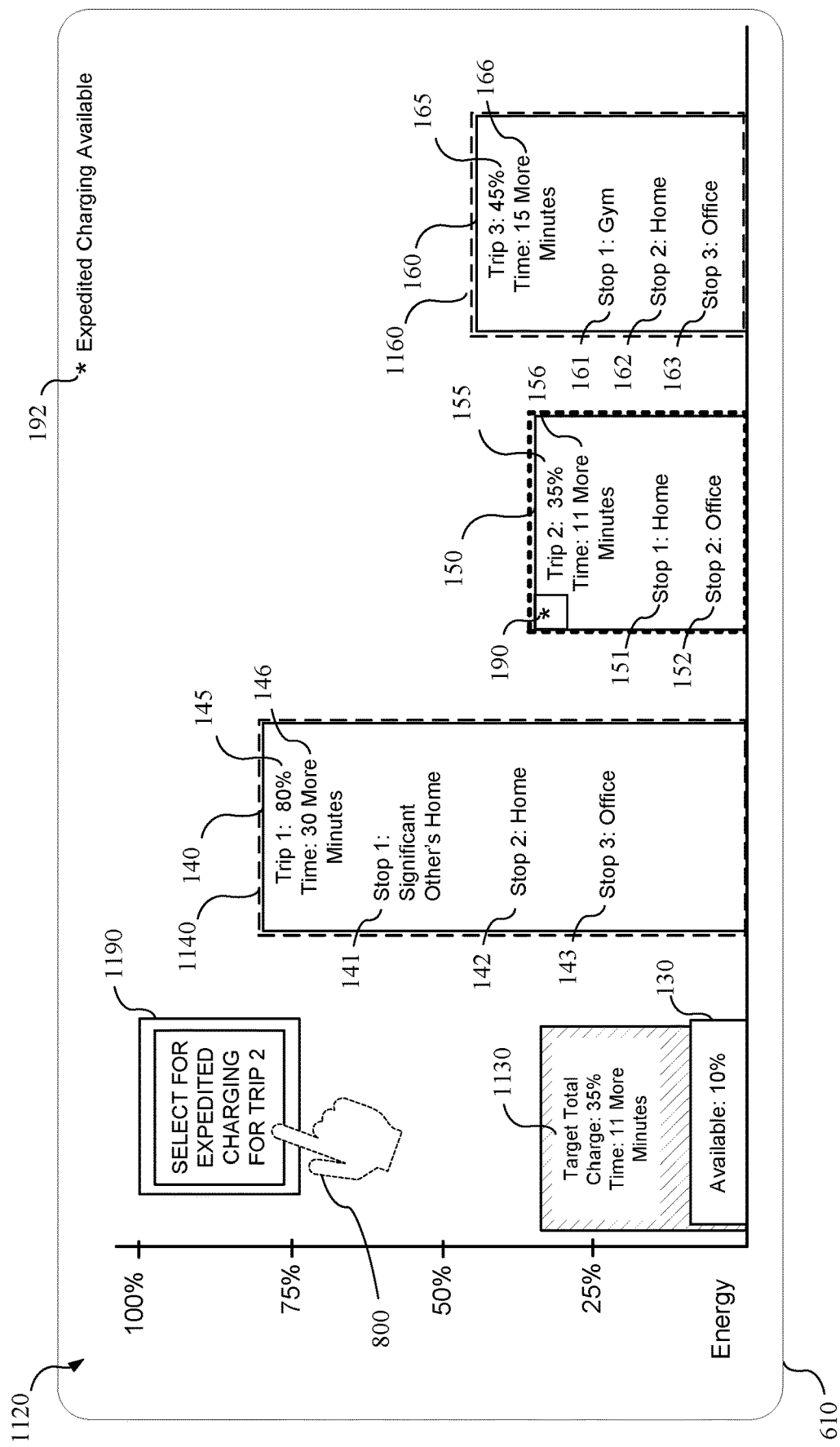

Referring additionally to FIG. 11, the display 610 presents updated travel information 1120 in response to the user's selection of Trip 2 150 as shown in FIG. 10. Next to the available charge 130, a charging indicator 1130 is presented indicating a total charge of 35% that will require 11 more minutes of charging. Information presented by the additional charge indicator 1130 corresponds with information associated with Trip 2 150 that reported that the trip would require a total charge 155 of 35% and would require an additional charging time 156 of 11 more minutes.

In various embodiments, because expedited charging is available for Trip 2 150, as evidenced by the expedited charge availability indicator 190 associated with Trip 2 150, the updated travel information 1120 also includes an expedited charge option 1190 that indicates that the user may select expedited charging to complete Trip 2 150. In the example of FIG. 11, the user uses the hand 800 to select the expedited charge option 1190.

Figure 12:
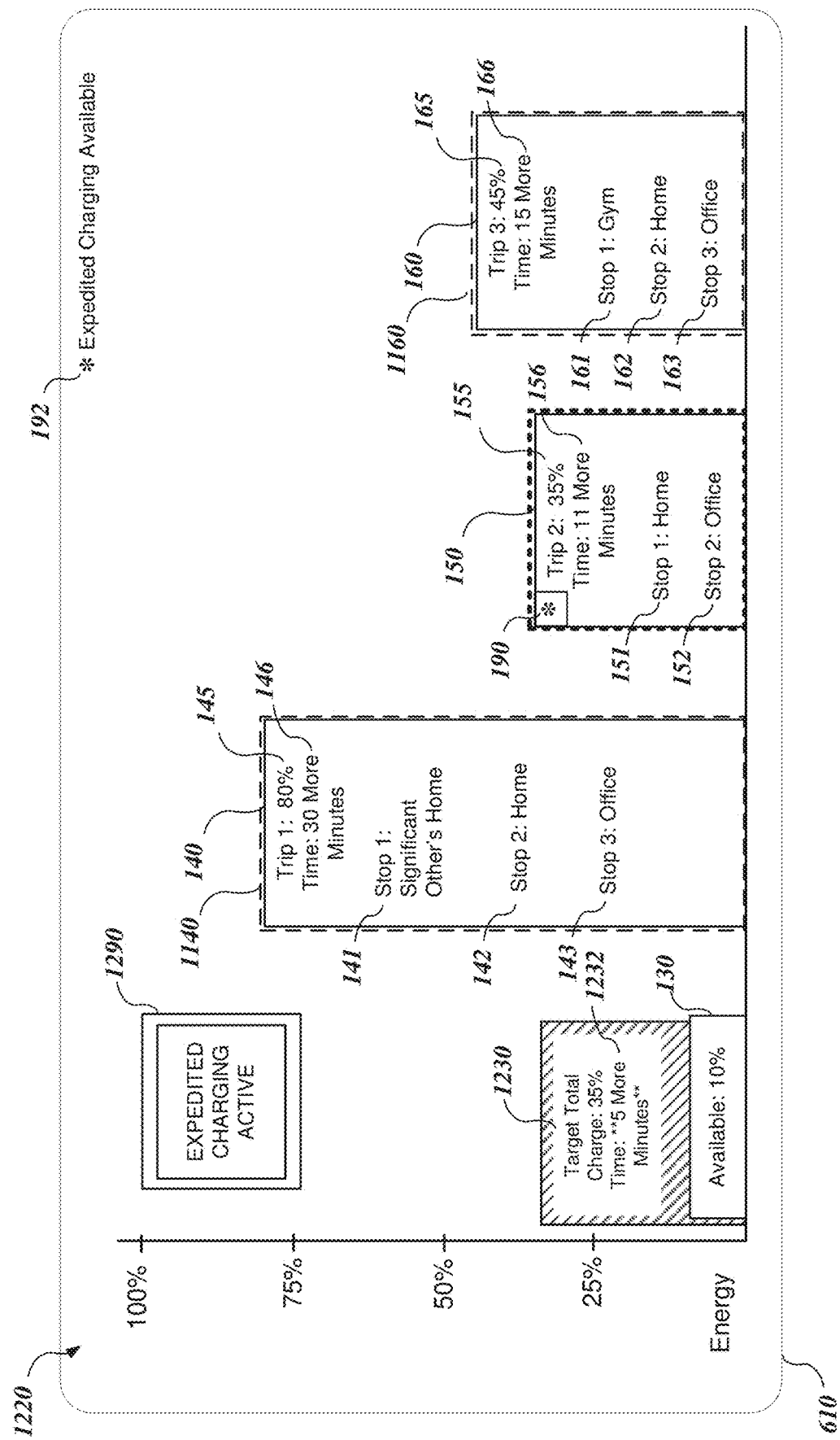

Referring additionally to FIG. 12, in response to the user's selection of the expedited charging option 1190, the display 610 presents updated travel information 1220. Next to the available charge 130, a charging indicator 1230 is presented indicating a total charge of 35% that will require only 5 more minutes of additional charging as a result of the use of expedited charging. A reduced charging time 1232 may be highlighted (as represented with asterisks in FIG. 12). In addition, an expedited charging indicator 1290 identifies that expedited charging is being used.

As represented by the expedited charge availability indicator 190 only being presented in association with Trip 2 150, the option of expedited charging is available only for Trip 2 150 in the present example. In various embodiments, the route planning system 110 evaluates the charging situation based on the charge needed for each trip relative to the available charge 130. Accordingly, it is possible that more than one trip presented in the travel information may provide for the option of expedited charging.

It also will be appreciated that expedited charging may be automatically initiated when the user chooses a trip for which expedited charging is available without the user having to separately elect the expedited charging option 1190, as shown in the example of FIG. 11. In addition, when expedited charging is available for a trip, the charging duration for the trip may include a duration using expedited charging, or the charging duration may be shown for both regular and expedited charging.

Figure 13:
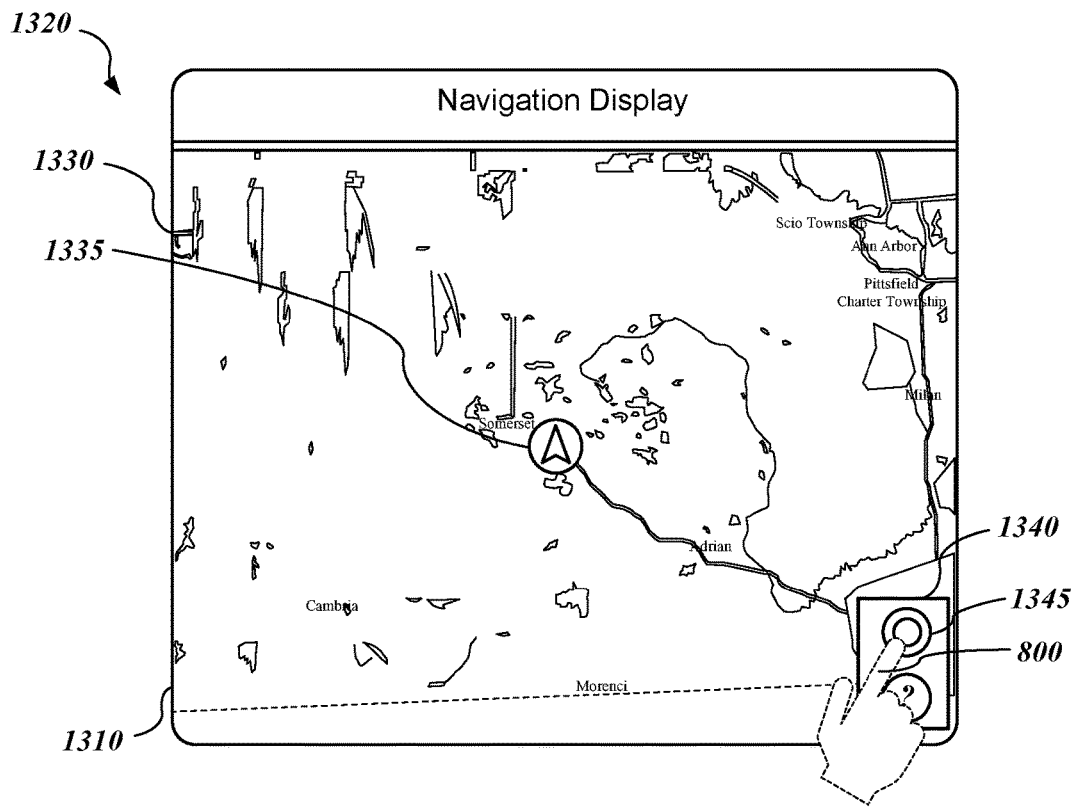

In various embodiments, the route planning system 110 also may be configured to provide travel information regarding the ability of the vehicle 100 to travel to one or more user-selected destinations based on available energy aboard the vehicle 100. Referring additionally to FIG. 13, travel information 1320 is presented on a display 1310 that, in various embodiments, may be presented by the route planning system 110 integrated within the vehicle 100, may be associated with the portable computing device 310 (FIG. 3), or may be presented by the remote computing device 570 (FIG. 5). In various embodiments, the travel information 1320 includes a map 1330 of an area around a present location 1335 of the vehicle 100. From a menu 1340, the user uses the hand 800 to select a destination option 1345 to select where the user wants to travel. Again, although the user uses the hand 800 to make a selection in the example of FIG. 13, it will be appreciated that the user could use a voice input or provide input using another input device to initiate selection of the destination option 1345.

Figure 14:
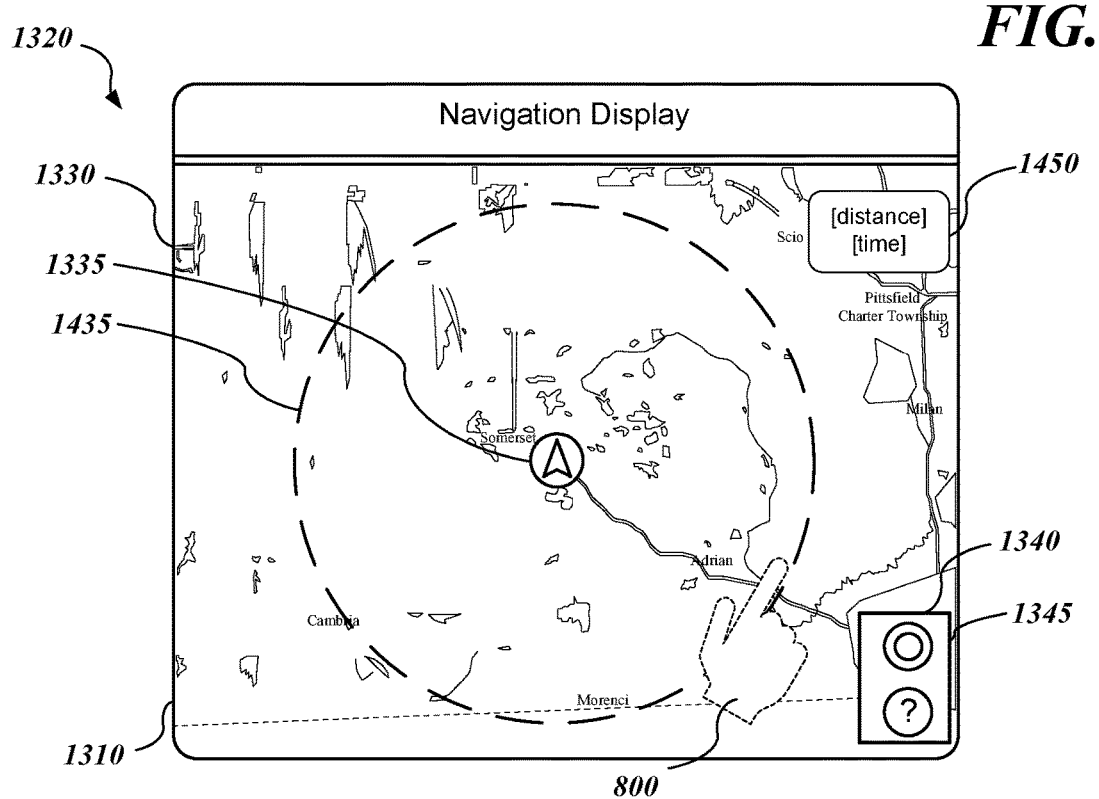

Referring additionally to FIG. 14, in various embodiments, in response to the user choosing the destination option 1345, the route planning system 110 (FIG. 1) presents updated travel information 1420 to include a range indicator 1435 indicative of a range the vehicle 100 can travel with the energy available aboard the vehicle 100. In various embodiments, the range indicator 1435 is displayed prior to the user actually selecting a destination. Thus, the user can make a destination selection informed of the range that the vehicle 100 can travel without charging the vehicle 100 or otherwise securing additional energy or fuel to make the trip. In various embodiments, in addition to or instead of the range indicator 1435 that graphically represents the travel range on the map 1330, the additional distance and/or time that the vehicle 100 may travel without securing additional energy or fuel may be presented by an alphanumeric indicator 1450.

Figure 15:
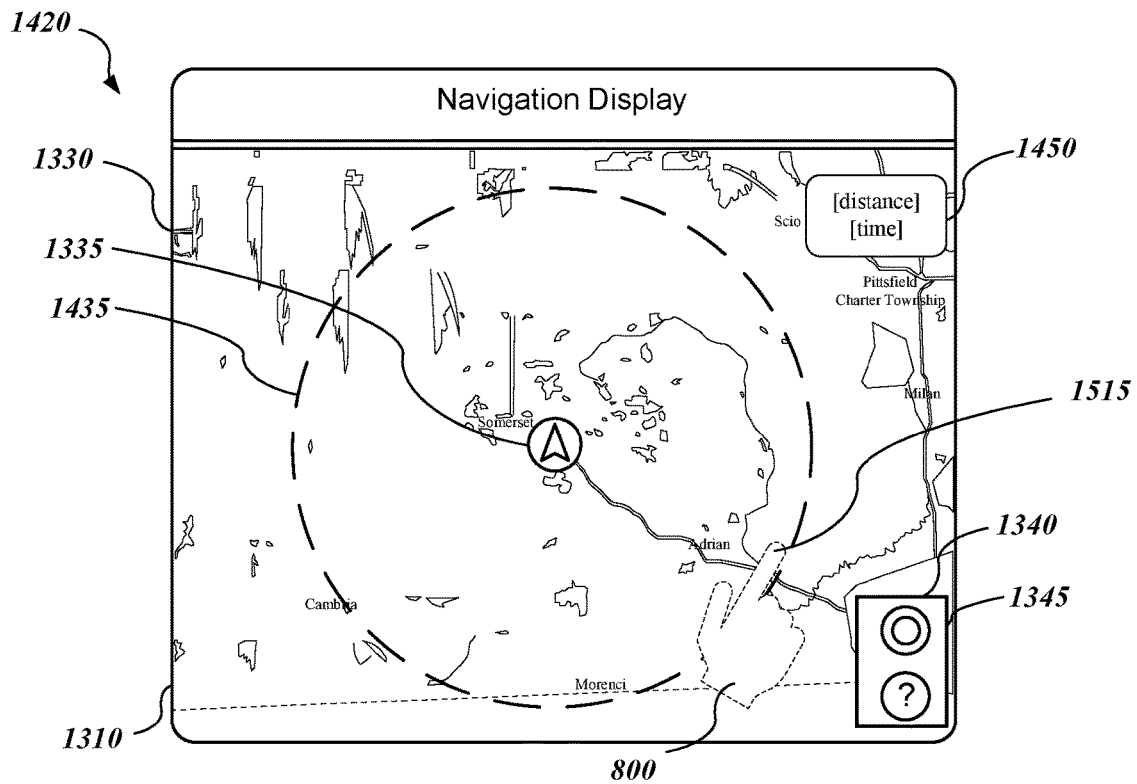
Figure 16:
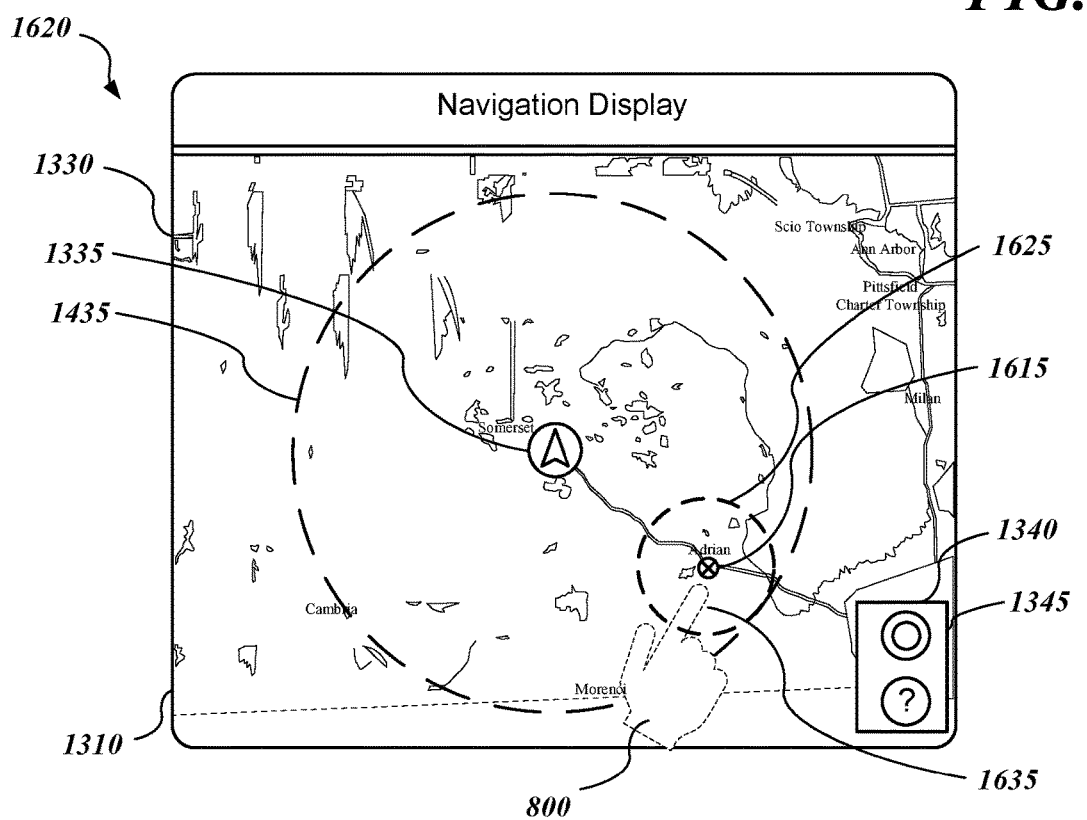

Referring additionally to FIG. 15, using the hand 800 or another method of input, the user selects a first destination 1515 within the area bounded by the range indicator 1435. Referring additionally to FIG. 16, the route planning system 110 causes further updated travel information 1620 to be displayed that includes a first destination marker 1615 to signify the user's selection of the first destination 1515 (FIG. 15). In various embodiments, a second range indicator 1625 is also presented to signify what additional range the vehicle 100 may travel after reaching the first destination 5415. Although not shown in FIG. 16, in various embodiments as described with reference to FIG. 14, an alphanumeric indicator may be included to present the additional distance or time that the vehicle 100 can travel without securing additional energy after reaching the first destination 1515 represented by the first destination marker 1615. With the second range indicator 1625 presented, using the hand 800 or another method of input, the user may select a second destination 1635 to which the user wishes to travel in the vehicle 100 after reaching the first destination 1515.

Figure 17:
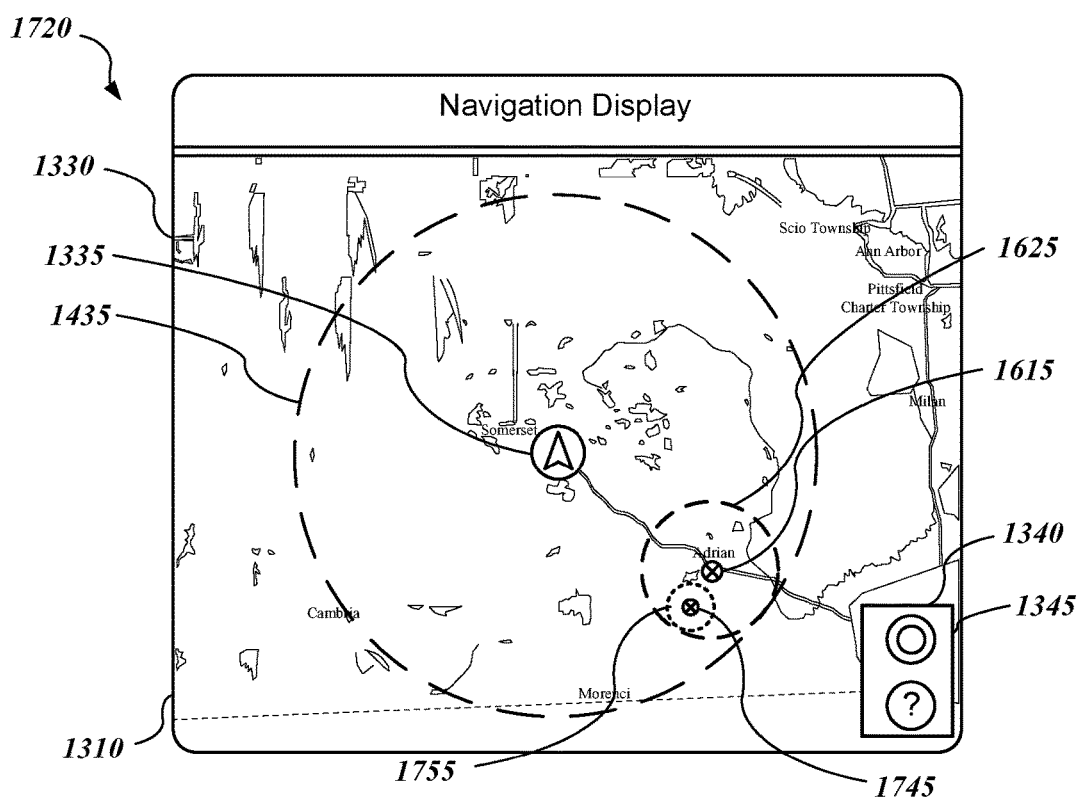

Referring additionally to FIG. 17, the route planning system 110 presents further updated travel information 1720 on the display 1310 to include a second destination marker 1745 to represent the second destination 1635 (FIG. 16) selected by the user. In various embodiments, the route planning system 110 also causes a third range indicator 1755 to be presented to signify what additional range the vehicle 100 may travel without securing additional energy after reaching the second destination 1635 represented by the second destination marker 1745. Although not shown in FIG. 17, in various embodiments as described with reference to FIG. 14, an alphanumeric indicator 1450 may be included to present the additional distance or time that the vehicle 100 can travel after reaching the second destination 1635 without securing additional energy. The route planning system 110 can successively present additional range indicators to help the operator or other user understand the extent to which the vehicle 100 can travel without securing additional energy or fuel.

Figure 18:
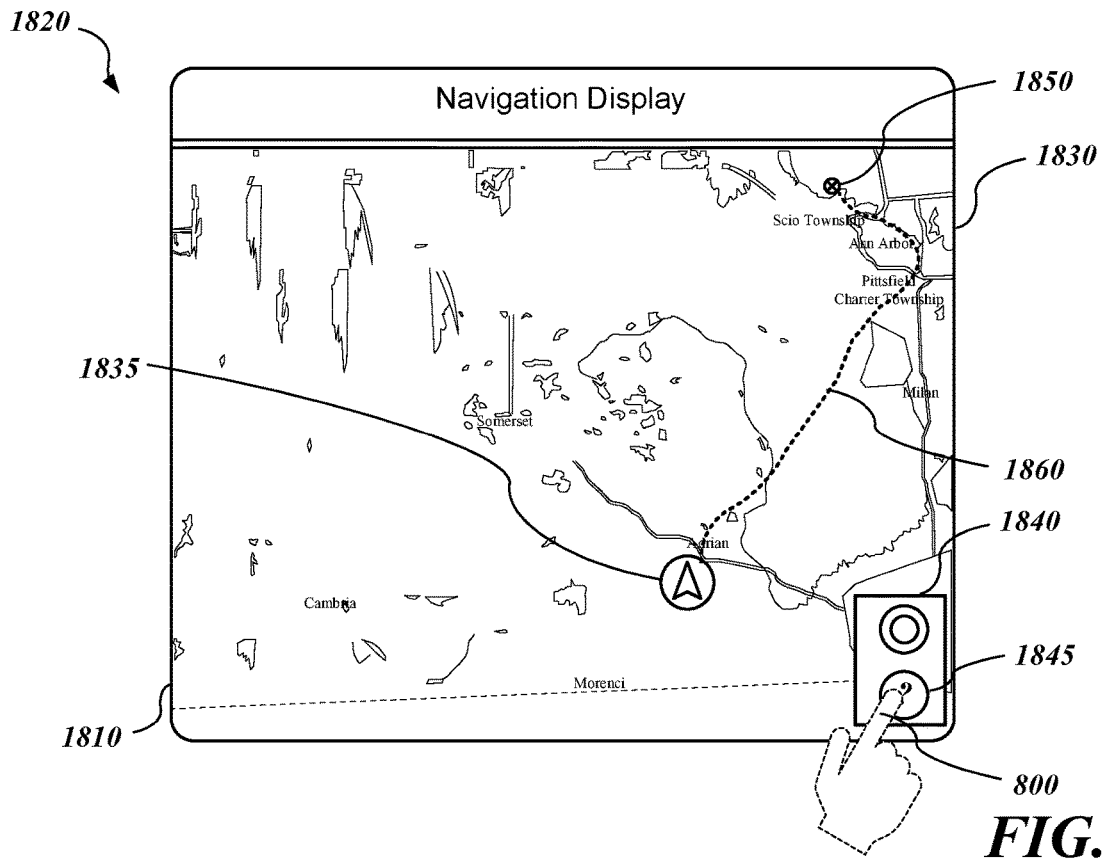

In various embodiments, the route planning system 110 also may be configured to provide travel information to the operator or other user regarding the ability to travel to one or more intermediate stops with the energy available aboard the vehicle. Referring additionally to FIG. 18, travel information 1820 is presented on a display 1810 that, in various embodiments, may be presented by the route planning system 110 integrated within the vehicle 100 (FIGS. 1 and 2), may be associated with the portable computing device 310 (FIG. 3), or may be presented by the remote computing device 570 (FIG. 5). In various embodiments, the travel information 1820 includes a map 1830 that encompasses a present location 1835 of the vehicle 100 and a selected destination 1850. The map 1830 also may include a route 1860 (or multiple possible routes) that the vehicle 100 may travel from the present location 1835 to the destination 1850. From a menu 1840, the user uses the hand 800 to engage a location input 1845 to enable the user to select an intermediate destination, such as a place to get something to eat. Again, although the user uses the hand 800 to make a selection in the example of FIG. 18, it will be appreciated that the user could use a voice input or provide input using another input device to engage the location input 1845.

Figure 19:
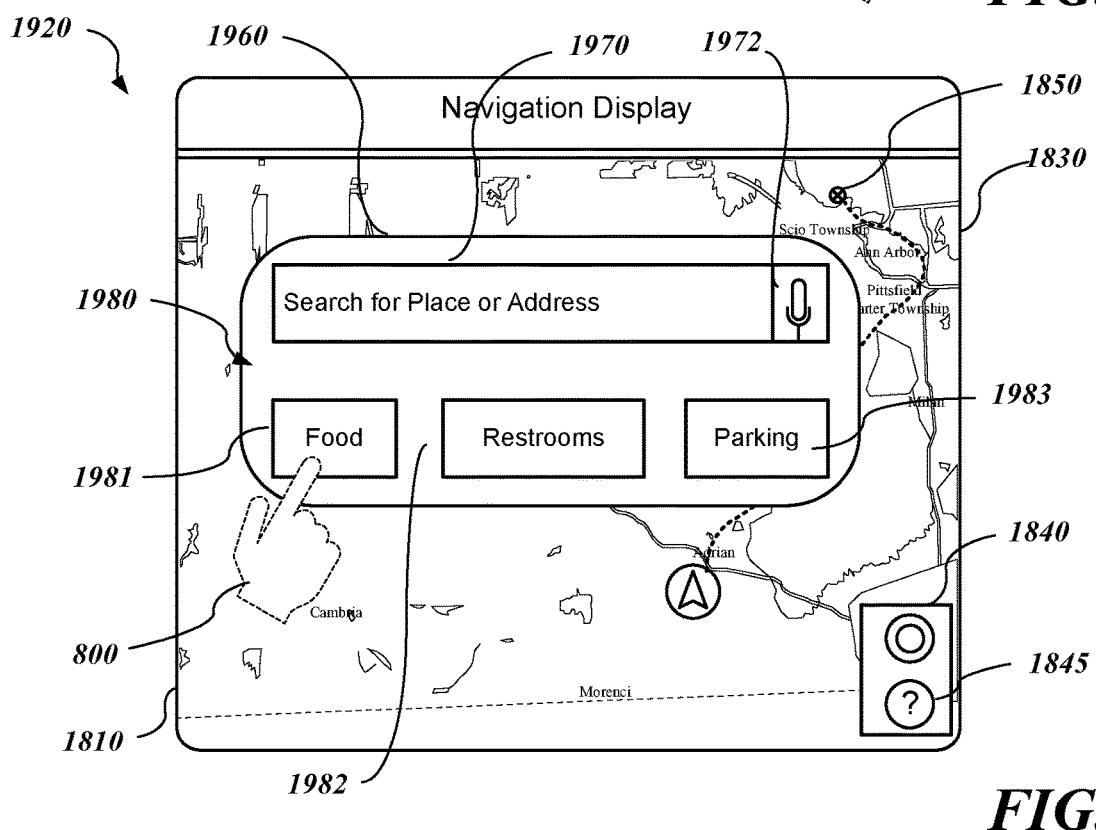

Referring additionally to FIG. 19, in response to the user engaging the location input 1845 (FIG. 18), the travel information 1920 presents a location menu 1960 on the display 1810. The location menu 1960 enables a user to enter a name of a place or address in an input field 1970. The input may be made via an on-screen keyboard (not shown in FIG. 19), via a voice command that may be enabled by selecting a voice command input 1972, or via another method of input. The location menu 1960 also may present the user with a range of location types 1981-1983 that the user can select with the hand 800 or another method of input. Thus, for example, if the user wants something to eat, the user may use the hand 800 to select the food input 1981.

Referring additionally to FIG. 20 and in various embodiments, in response to the user's selection of the food input 1981 (FIG. 18), the route planning system 110 presents updated travel information 2020. In the travel information 2020, the location input menu 1960 is replaced with a list 2000 of nearby eating establishments. The list 2000 includes entries 2001-2005 for places to eat within a selected or predetermined range of the current location 1835 of the vehicle 100 (or from the route 1860). Each of the entries 2001-2005 includes an identifier 2011-2015, respectively, corresponding to the entries 2001-2005. In various embodiments, the travel information 2020 adds location markers 2021-2025 to the map 1830 corresponding with each of the eating establishments included in the list 2000. In various embodiments, the location markers 2021-2025 include indicia that correspond with the identifiers 2011-2015, respectively, in the list 2000, as further described below. By cross-referencing the identifiers 2011-2015 in the list 2000 with the location markers 2021-2025, the user may readily associate information included in the entries 2001-2005 with their locations on the map 1830.

In various embodiments, the identifiers 2011-2015 and corresponding location markers 2021-2025 provide information regarding how traveling to the associated destinations will the affect the energy storage aboard the vehicle 100. In various embodiments, the route planning system 110 presents a legend 2050 to indicate what the particular identifiers 2011-2015 and location markers 2021-2025 signify. FIGS. 21 and 22, in connection with FIG. 20, are used to explain the information represented in the travel information 2020, in the list 2000 (FIG. 21), and in the legend 2050 (FIG. 22).

Referring additionally to FIG. 21, the list 2000 of eating establishments includes the entries 2001-2005 and the identifiers 2011-2015 for each of the eating establishments. In addition, for the convenience of the operator and the user, the list 2000 presents additional information for each of the entries 2001-2005. Using the first entry 2001 as an example, the entry includes a food type 2101 which may be represented textually or, as in the example of FIG. 21, by an icon representative of the type of eating establishment. The entry 2001 also includes a name 2102 of the establishment and an address 2103 of the establishment. In various embodiments, the entry 2001 also may include a rating 2104 derived from a ratings service and/or the user's own historical entries to signify an appraisal of the quality of the food at the establishment. In various embodiments, the entry 2001 also may include an additional time 2105 that signifies an estimate of how much travel time is added to the trip to the destination 1850 by visiting the establishment. By comparing the information included in the entries 2001-2005 included in the list, the operator or user can make a considered choice about where to stop to get something to eat.

As previously described, in various embodiments, the identifiers 2011-2015 and corresponding location markers 2021-2025 may be used to present information about the effect traveling to the listed establishments will have on the energy stored aboard the vehicle 100. As shown in FIG. 22, the legend 2050 explains the information signified by the identifiers 2011-2015 and corresponding location markers 2021-2025 presented on the map 1730 (FIG. 20). As shown in FIGS. 20-22, four types of indicators 2211-2214 are included representing four different energy storage conditions 2221-2224, respectively.

The first indicator 2211 includes a solid outer ring that signifies that, by traveling to the associated establishment, the energy storage will be in a first condition 2221 upon reaching the destination. In the first condition 2221, the energy storage will maintain greater than 15% of its capacity after traveling to the associated establishment and to the destination 1850. The second indicator 2212 includes a dashed outer ring that signifies that, by traveling to the associated establishment, the energy storage will be in a second condition 2222 upon reaching the destination 1850. In the second condition 2222, the energy storage will be between 10% and 15% of its capacity after traveling to the associated establishment and to the destination 1850. The third indicator 2213 includes a dotted outer ring that signifies that, by traveling to the associated establishment, the energy storage will be in a third condition 2223 upon reaching the destination 1850. In the third condition 2223, the energy storage will be between 5% and 10% of its capacity after traveling to the associated establishment and to the destination 1850. The fourth indicator 2214, instead of a ring, includes a rectangle that signifies that, in order to travel to the associated establishment, the vehicle 100 will have to be supplied with additional energy in order to reach the destination 1850.

Using the indicators 2211-2214, the user can readily determine how traveling to an establishment associated with each of the indicators 2211-2214 may affect travel to the destination 1850. Thus, in concert with other information included in the list 2000, the user can balance desires for types or quality of food, additional travel time, desired remaining energy capacity at the destination 1850 and/or willingness to stop to replenish the energy supply of the vehicle 100 during the trip.

Thus, for example, if the user wants or is willing to have pizza at the establishment included in the first entry 2001, an additional travel time of only two minutes will be added to the trip, and the vehicle 100 will retain an energy capacity of more than 15% upon reaching the destination 1850. However, at another extreme, if the user chooses to visit the establishment included in the fifth entry 2005, visiting the establishment will add an additional travel time 2150 of 25 minutes to the trip. Furthermore, as signified by the indicator 2214 associated with the fifth entry 2005, the user will also have to replenish the energy stored aboard the vehicle 100 to even reach the destination 1850.

Although the indicators 2211-2214 are differentiated with different line patters, the indicators 2211-2214 may be differentiated with any other visual qualities, such as colors, size, brightness, or other visual features.

Figure 23:
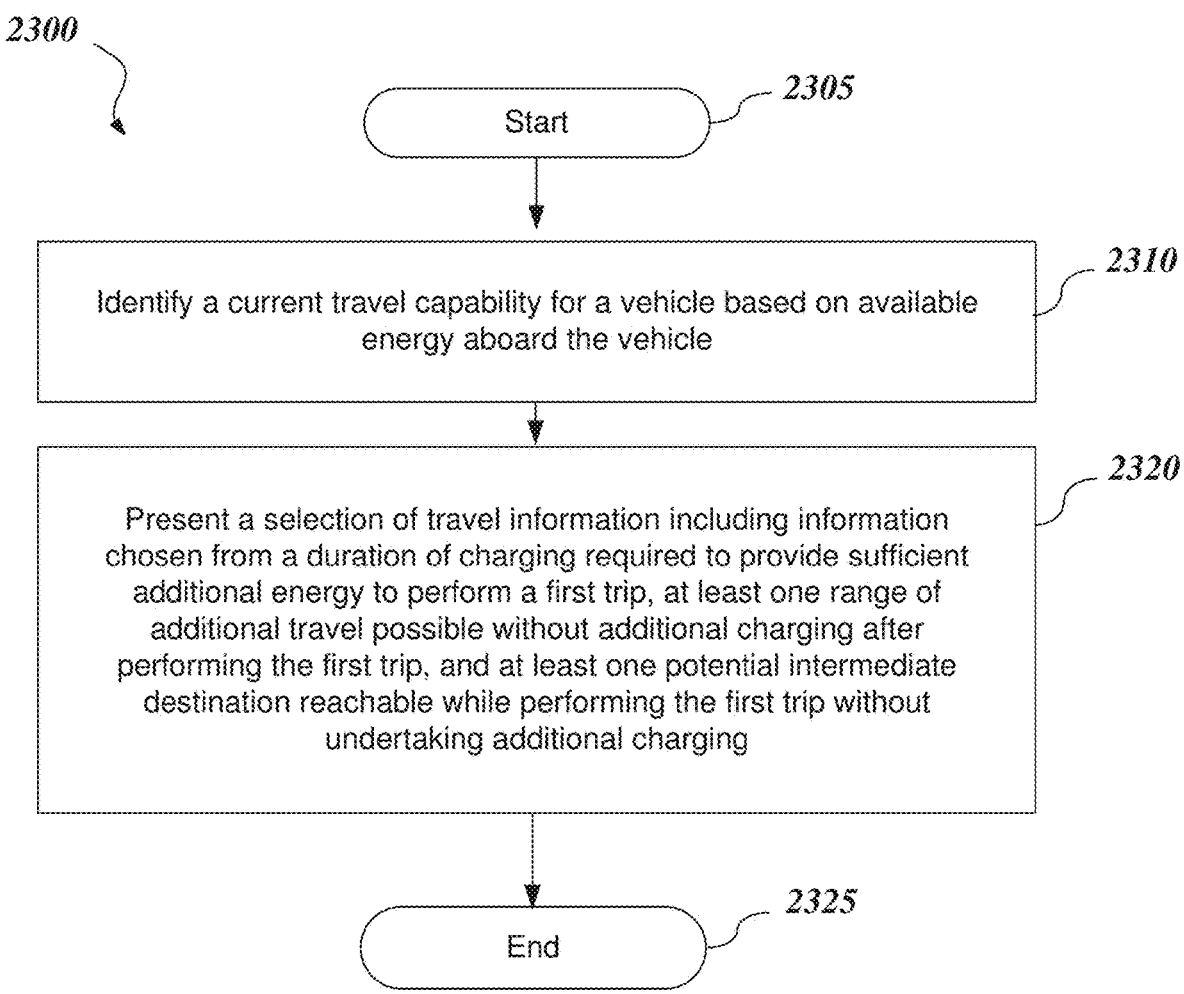
FIG. 23 is a flow chart of an illustrative method for identifying a current travel capability for a vehicle based on available energy aboard the vehicle.

Referring additionally to FIG. 23, an illustrative method 2300 is provided to determine a current travel capability for a vehicle based on available energy aboard the vehicle. The method 2300 starts at a block 2305. At a block 2310, a current travel capability for a vehicle is identified based on available energy aboard the vehicle. At a block 2320, a selection of travel information is presented. The travel information includes information chosen from a duration of charging required to provide sufficient additional energy to perform a first trip, at least one range of additional travel possible without additional charging after performing the first trip, and at least one potential intermediate destination reachable while performing the first trip without undertaking additional charging. The method ends at a block 2325.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system comprising:
a computing device having computer-readable media storing computer-executable instructions configured to cause the computing device to:
identify a current travel capability for a vehicle based on available energy aboard the vehicle;
present a selection of travel information to a user of the computing device for multiple trips, the travel information including information chosen from:
at least one duration of charging required to provide sufficient additional energy to perform an associated trip of the multiple trips;
at least one range of additional travel possible without additional charging after performing an associated trip of the multiple trips; and
at least one potential intermediate destination reachable while performing an associated trip of the multiple trips without undertaking additional charging;
determine a period of time of expedited charging that would generate heat sufficient to damage power cells of the vehicle;
determine an additional energy sufficient to perform at least one trip of the multiple trips;
determine that a duration of a single expedited charging session to provide the additional energy sufficient to perform the at least one trip is less than the period of time; and
in response to the user selecting the at least one trip with the duration of the single expedited charging session to provide the additional energy sufficient to perform the at least one trip determined to be less than the period of time for which the single expedited charging session would generate heat sufficient to damage power cells of the vehicle, present updated travel information to the user of the computing device including an expedited charge option selectable by the user to initiate an expedited charging mode to provide the additional energy sufficient to perform the at least one trip.

2. The system of claim 1, wherein the computer-executable instructions are further configured to cause the computing device to:
present to the user a choice of the multiple trips from among a plurality of frequently-taken trips; and
present the duration of charging required for each of the plurality of frequently-taken trips.

3. The system of claim 2, wherein the plurality of frequently-taken trips is determined from a statistical analysis of trips previously taken in the vehicle.

4. The system of claim 3, wherein the duration of charging is based on the expedited charging mode when using the expedited charging for the duration of charging is less than a period for which the single expedited charging session would damage power cells of the vehicle.

5. The system of claim 1, wherein the computer-executable instructions are further configured to, in response to the user selecting a trip of the multiple trips, cause the computing device to graphically present updated travel information to the user of the computing device such that a map is presented to the user including a last destination marker for the selected trip and a range indicator bounding an area around the last destination marker and representing the range of additional travel possible without additional charging after performing the selected trip of the multiple trips.

6. The system of claim 5, wherein the computer-executable instructions are further configured to cause the computing device to:
enable a user to identify a plurality of successive destinations for the additional travel possible; and
in response to identification of each of the plurality of successive destinations being identified, graphically present updated travel information, while continuing to present the range indicator bounding the area around the last destination marker, to the user of the computing device such that the map is updated to include a successive destination marker for the identified successive destination of the plurality of successive destinations and a successive range indicator bounding an area around the successive destination marker and representing a successive range of additional travel possible without additional charging after performing the selected trip of the multiple trips and traveling to each of the previously identified successive destinations, each successive range indicator being positioned entirely within the range indicator bounding the area around the last destination marker.

7. The system of claim 1, wherein the computer-executable instructions are further configured to cause the computing device to provide a list of at least one potential intermediate destination reachable while performing an associated trip of the multiple trips without undertaking additional charging in response to a user identification of a product or service offered by the at least one potential intermediate destination.

8. The system of claim 7, wherein the computer-executable instructions are further configured to cause the computing device to provide a list of at least one additional potential intermediate destination reachable responsive to undertaking additional charging during the associated trip of the multiple trips with a stop at the at least one additional potential intermediate destination.

9. The system of claim 1, wherein the computer-executable instructions are further configured to cause the computing device to provide for the at least one potential intermediate destination reachable while performing the associated trip of the multiple trips without undertaking additional charging and present a projected amount of available energy remaining aboard the vehicle responsive to completion of the associated trip of the multiple trips and a stop at the at least one potential intermediate destination.

10. The system of claim 1, wherein the computer-executable instructions are further configured to cause the computing device to:
present to the user, in response to determining that the duration of expedited charging to provide the additional energy sufficient to perform the at least one trip is less than the period for which the single expedited charging session would damage power cells of the vehicle, an indicator within the travel information indicating that the expedited charging mode is available for the associated at least one trip.

11. The system of claim 1, wherein each trip of the multiple trips includes a different combination of destinations than the other trips of the multiple trips such that at least one trip of any two trips of the multiple trips includes a different destination than the destinations of the other trip of the any two trips.

12. A vehicle comprising:
a cabin configured to receive at least one occupant;
a drive system configured to move, accelerate, decelerate, stop, and steer the vehicle; and
a computing device having computer-readable media storing computer-executable instructions configured to cause the computing device to:
identify a current travel capability for the vehicle based on available energy aboard the vehicle;
present a selection of travel information to a user of the computing device for multiple trips, the travel information including information chosen from:
at least one duration of charging required to provide sufficient additional energy to perform an associated trip of the multiple trips;
at least one range of additional travel possible without additional charging after performing an associated trip of the multiple trips; and
at least one potential intermediate destination reachable while performing an associated trip of the multiple trips without undertaking additional charging;
determine a period of time of expedited charging that would generate heat sufficient to damage power cells of the vehicle;
determine an additional energy sufficient to perform at least one trip of the multiple trips;
determine that a duration of a single expedited charging session to provide the additional energy sufficient to perform the at least one trip is less than the period of time; and
in response to the user selecting the at least one trip with the duration of the single expedited charging session to provide the additional energy sufficient to perform the at least one trip determined to be less than the period of time for which the single expedited charging session would generate heat sufficient to damage power cells of the vehicle, present updated travel information to the user of the computing device including an expedited charge option selectable by the user to initiate an expedited charging mode to provide the additional energy sufficient to perform the at least one trip.

13. The vehicle of claim 12, wherein the computer-executable instructions are further configured to cause the computing device to:
present to the user a choice of the multiple trips from among a plurality of frequently-taken trips, wherein the plurality of frequently-taken trips is determined from a statistical analysis of trips previously taken in the vehicle; and
present the duration of charging required for each of the plurality of frequently-taken trips.

14. The vehicle of claim 13, wherein the duration of charging is based on the expedited charging mode when using the expedited charging for the duration of charging is less than a period for which the single expedited charging session would damage power cells of the vehicle.

15. The vehicle of claim 12, wherein the computer-executable instructions are further configured to, in response to the user selecting a trip of the multiple trips, cause the computing device to graphically present updated travel information to the user of the computing device such that a map is presented to the user including a last destination marker for the selected trip and a range indicator bounding an area around the last destination marker and representing the range of additional travel possible without additional charging after performing the selected trip of the multiple trips.

16. The vehicle of claim 15, wherein the computer-executable instructions are further configured to cause the computing device to:
enable a user to identify a plurality of successive destinations for the additional travel possible; and
in response to identification of each of the plurality of successive destinations being identified, graphically present updated travel information to the user of the computing device such that the map is updated to include a successive destination marker for the identified successive destination of the plurality of successive destinations and a successive range indicator bounding an area around the successive destination marker and representing a successive range of additional travel possible without additional charging after performing the selected trip of the multiple trips and traveling to each of the previously identified successive destinations.

17. The vehicle of claim 12, wherein the computer-executable instructions are further configured to cause the computing device to provide a list of at least one potential intermediate destination reachable while performing an associated trip of the multiple trips without undertaking additional charging in response to a user identification of a product or service offered by the at least one potential intermediate destination.

18. The vehicle of claim 17, wherein the computer-executable instructions are further configured to cause the computing device to provide a list of at least one additional potential intermediate destination reachable responsive to undertaking additional charging during the associated trip of the multiple trips with a stop at the at least one additional potential intermediate destination.

19. The vehicle of claim 12, wherein the computer-executable instructions are further configured to cause the computing device to provide for the at least one potential intermediate destination reachable while performing the associated trip of the multiple trips without undertaking additional charging and present a projected amount of available energy remaining aboard the vehicle responsive to completion of the associated trip of the multiple trips and a stop at the at least one potential intermediate destination.

20. A computer-implemented method comprising:
identifying a current travel capability for a vehicle based on available energy aboard the vehicle;

presenting a selection of travel information for multiple trips including information chosen from:
- at least one duration of charging required to provide sufficient additional energy to perform an associated trip of the multiple trips;
- at least one range of additional travel possible without additional charging after performing an associated trip of the multiple trips; and
- at least one potential intermediate destination reachable while performing an associated trip of the multiple trips without undertaking additional charging;

determining a period of time of expedited charging that would generate heat sufficient to damage power cells of the vehicle;

determining an additional energy sufficient to perform at least one trip of the multiple trips;

determining that a duration of a single expedited charging session to provide the additional energy sufficient to perform the at least one trip is less than the period of time; and in response to the user selecting the at least one trip with the duration of the single expedited charging session to provide the additional energy sufficient to perform the at least one trip determined to be less than the period of time for which the single expedited charging session would generate heat sufficient to damage power cells of the vehicle, automatically initiate an expedited charging mode to provide the additional energy sufficient to perform the at least one trip.

* * * * *